(12) United States Patent
Yalamarthy et al.

(10) Patent No.: US 11,802,554 B2
(45) Date of Patent: Oct. 31, 2023

(54) MEMS-BASED AIRFLOW SYSTEM HAVING A VIBRATING FAN ELEMENT ARRANGEMENT

(71) Applicant: Frore Systems Inc., San Jose, CA (US)

(72) Inventors: Ananth Saran Yalamarthy, Stanford, CA (US); Vikram Mukundan, San Ramon, CA (US); Suryaprakash Ganti, Los Altos, CA (US); Narayana Prasad Rayapati, Mountain View, CA (US); Prabhu Sathyamurthy, San Jose, CA (US); Seshagiri Rao Madhavapeddy, La Jolla, CA (US); Marc Mignard, Los Gatos, CA (US); Brian James Gally, Los Gatos, CA (US)

(73) Assignee: Frore Systems Inc., San Jose, CA (US)

( * ) Notice: Subject to any disclaimer, the term of this patent is extended or adjusted under 35 U.S.C. 154(b) by 0 days.

(21) Appl. No.: 17/081,890

(22) Filed: Oct. 27, 2020

(65) Prior Publication Data
US 2021/0131415 A1 May 6, 2021

Related U.S. Application Data

(60) Provisional application No. 62/928,209, filed on Oct. 30, 2019.

(51) Int. Cl.
*F04B 43/04* (2006.01)
*F04B 49/00* (2006.01)
*F04B 45/047* (2006.01)

(52) U.S. Cl.
CPC .......... *F04B 43/046* (2013.01); *F04B 45/047* (2013.01); *F04B 49/00* (2013.01)

(58) Field of Classification Search
CPC ...... F04B 43/043; F04B 43/046; F04B 49/00; F04B 39/121; F04B 45/047; G05D 19/02
See application file for complete search history.

(56) References Cited

U.S. PATENT DOCUMENTS

| 4,251,031 A | 2/1981 | Martin |
| 4,450,505 A | 5/1984 | Mittal |
| 4,595,338 A | 6/1986 | Kolm |

(Continued)

FOREIGN PATENT DOCUMENTS

| CN | 101032718 | 9/2007 |
| CN | 101718235 | 6/2010 |

(Continued)

OTHER PUBLICATIONS

Murata Manufacturing Co., Ltd., Microblower MZB1001T02, Microblower (Air Pump), Micro Mechatronics, Apr. 2014, downloaded from: https://www.murata.com/en-us/products/mechatronics/fluid/microblower_mzb1001t02.

(Continued)

*Primary Examiner* — Nathan C Zollinger
(74) *Attorney, Agent, or Firm* — Van Pelt, Yi & James LLP

(57) ABSTRACT

A system including an orifice plate, a fan element and at least one channel is disclosed. The orifice plate has at least one orifice therein. The fan element is configured to undergo vibrational motion to drive a fluid through the orifice(s). The fluid is drawn through the channel(s) in response to the fluid being driven through the at least one orifice.

16 Claims, 12 Drawing Sheets

(56) References Cited

U.S. PATENT DOCUMENTS

| | | | |
|---|---|---|---|
| 4,667,877 A | 5/1987 | Yao | |
| 4,751,713 A | 6/1988 | Affleck | |
| 4,780,062 A * | 10/1988 | Yamada | F04D 33/00 417/410.2 |
| 4,834,619 A | 5/1989 | Walton | |
| 4,923,000 A | 5/1990 | Nelson | |
| 5,008,582 A | 4/1991 | Tanuma | |
| 5,673,171 A | 9/1997 | Varghese | |
| 5,758,823 A | 6/1998 | Glezer | |
| 5,796,152 A | 8/1998 | Carr | |
| 5,821,962 A | 10/1998 | Kudo | |
| 5,861,703 A | 1/1999 | Losinski | |
| 6,211,598 B1 | 4/2001 | Dhuler | |
| 6,232,680 B1 | 5/2001 | Bae | |
| 6,450,773 B1 | 9/2002 | Upton | |
| 6,483,419 B1 | 11/2002 | Weaver | |
| 6,498,725 B2 | 12/2002 | Cole | |
| 6,531,947 B1 | 3/2003 | Weaver | |
| 6,570,750 B1 | 5/2003 | Calcatera | |
| 6,588,497 B1 | 7/2003 | Glezer | |
| 6,598,960 B1 | 7/2003 | Cabal | |
| 6,612,816 B1 * | 9/2003 | Vanden Brande | F04D 19/04 417/413.2 |
| 6,650,542 B1 | 11/2003 | Chrysler | |
| 6,713,942 B2 | 3/2004 | Raman | |
| 6,771,158 B2 | 8/2004 | Lee | |
| 6,853,068 B1 | 2/2005 | Djekic | |
| 6,876,047 B2 | 4/2005 | Cunningham | |
| 6,996,441 B1 | 2/2006 | Tobias | |
| 7,023,697 B2 | 4/2006 | Pokharna | |
| 7,031,155 B2 | 4/2006 | Sauciuc | |
| 7,081,699 B2 | 7/2006 | Keolian | |
| 7,258,464 B2 | 8/2007 | Morris | |
| 7,282,837 B2 | 10/2007 | Scher | |
| 7,321,184 B2 | 1/2008 | Lee | |
| 7,324,323 B2 | 1/2008 | Aksyuk | |
| 7,420,807 B2 | 9/2008 | Mikubo | |
| 7,492,076 B2 | 2/2009 | Heim | |
| 7,516,776 B2 | 4/2009 | Bezama | |
| 7,553,135 B2 | 6/2009 | Cho | |
| 7,714,433 B2 | 5/2010 | Campini | |
| 7,742,299 B2 | 6/2010 | Sauciuc | |
| 7,972,124 B2 * | 7/2011 | Hirata | F04B 45/047 417/413.2 |
| 8,051,905 B2 | 11/2011 | Arik | |
| 8,289,701 B2 | 10/2012 | Suzuki | |
| 8,297,947 B2 | 10/2012 | Van Rensburg | |
| 8,308,453 B2 | 11/2012 | Yamamoto | |
| 8,308,454 B2 | 11/2012 | Kamitani | |
| 8,520,383 B2 | 8/2013 | Park | |
| 8,520,384 B2 | 8/2013 | Park | |
| 8,659,896 B2 | 2/2014 | Dede | |
| 8,678,787 B2 | 3/2014 | Hirata | |
| 8,684,707 B2 | 4/2014 | Kanai | |
| 8,736,139 B2 | 5/2014 | Lee | |
| 8,899,944 B2 | 12/2014 | Kanai | |
| 8,934,240 B2 * | 1/2015 | Yu | H01L 23/467 361/694 |
| 9,179,575 B1 | 11/2015 | Yao | |
| 9,215,520 B2 | 12/2015 | De Bock | |
| 9,252,069 B2 | 2/2016 | Bhunia | |
| 9,466,452 B1 | 10/2016 | Liu | |
| 9,523,367 B2 | 12/2016 | Lucas | |
| 9,846,461 B2 | 12/2017 | Tang | |
| 9,976,547 B2 | 5/2018 | Tanaka | |
| 10,045,461 B1 | 8/2018 | Boozer | |
| 10,288,192 B2 | 5/2019 | Han | |
| 10,364,910 B2 | 7/2019 | Han | |
| 10,480,502 B2 | 11/2019 | Hirata | |
| 10,943,850 B2 | 3/2021 | Ganti | |
| 11,043,444 B2 | 6/2021 | Ganti | |
| 11,242,241 B2 | 2/2022 | Menon | |
| 11,466,674 B2 | 10/2022 | Chang | |
| 11,503,742 B2 * | 11/2022 | Mukundan | H05K 7/20509 |
| 2002/0163782 A1 | 11/2002 | Cole | |
| 2002/0184907 A1 | 12/2002 | Vaiyapuri | |
| 2004/0023614 A1 | 2/2004 | Koplin | |
| 2004/0190251 A1 | 9/2004 | Prasher | |
| 2004/0196999 A1 | 10/2004 | Han | |
| 2004/0218362 A1 | 11/2004 | Amaro | |
| 2004/0244405 A1 | 12/2004 | Kim | |
| 2004/0253130 A1 | 12/2004 | Sauciuc | |
| 2005/0074662 A1 * | 4/2005 | Cho | G06F 1/20 429/444 |
| 2005/0089415 A1 * | 4/2005 | Cho | F04B 45/047 417/413.1 |
| 2005/0110841 A1 | 5/2005 | Silverbrook | |
| 2005/0178529 A1 | 8/2005 | Suzuki | |
| 2005/0211418 A1 | 9/2005 | Kenny | |
| 2005/0225213 A1 | 10/2005 | Richards | |
| 2005/0266286 A1 | 12/2005 | Sato | |
| 2005/0280994 A1 | 12/2005 | Yazawa | |
| 2006/0147324 A1 | 7/2006 | Tanner | |
| 2006/0164805 A1 | 7/2006 | Meinders | |
| 2006/0181848 A1 | 8/2006 | Kiley | |
| 2006/0208613 A1 | 9/2006 | Scher | |
| 2006/0232167 A1 | 10/2006 | Jordan | |
| 2006/0236710 A1 | 10/2006 | Vaiyapuri | |
| 2006/0250773 A1 | 11/2006 | Campbell | |
| 2006/0250774 A1 | 11/2006 | Campbell | |
| 2006/0260784 A1 | 11/2006 | Bezama | |
| 2006/0268534 A1 | 11/2006 | Paydar | |
| 2007/0020124 A1 | 1/2007 | Singhal | |
| 2007/0037506 A1 | 2/2007 | Lee | |
| 2007/0048154 A1 | 3/2007 | Sapir | |
| 2007/0076375 A1 | 4/2007 | Mongia | |
| 2007/0235180 A1 | 10/2007 | Ouyang | |
| 2007/0274045 A1 | 11/2007 | Campbell | |
| 2008/0041574 A1 | 2/2008 | Arik | |
| 2008/0101965 A1 | 5/2008 | Zhang | |
| 2008/0111866 A1 | 5/2008 | Silverbrook | |
| 2008/0218972 A1 | 9/2008 | Sauciuc | |
| 2008/0304979 A1 | 12/2008 | Lucas | |
| 2009/0021908 A1 | 1/2009 | Patel | |
| 2009/0034197 A1 | 2/2009 | Leija | |
| 2009/0050294 A1 | 2/2009 | Fedorov | |
| 2009/0120621 A1 | 5/2009 | Sheinman | |
| 2009/0148320 A1 | 6/2009 | Lucas | |
| 2009/0167109 A1 | 7/2009 | Tomita | |
| 2009/0174999 A1 | 7/2009 | Sauciuc | |
| 2009/0232683 A1 | 9/2009 | Hirata | |
| 2009/0232684 A1 | 9/2009 | Hirata | |
| 2009/0232685 A1 | 9/2009 | Kamitani | |
| 2010/0067109 A1 | 3/2010 | Arik | |
| 2010/0073431 A1 | 3/2010 | Silverbrook | |
| 2010/0074775 A1 | 3/2010 | Yamamoto | |
| 2011/0063800 A1 | 3/2011 | Park | |
| 2011/0068799 A1 | 3/2011 | Wolf | |
| 2011/0096125 A1 | 4/2011 | Silverbrook | |
| 2011/0122582 A1 | 5/2011 | Park | |
| 2011/0211020 A1 | 9/2011 | Silverbrook | |
| 2011/0259557 A1 | 10/2011 | Chao | |
| 2011/0277491 A1 | 11/2011 | Wu | |
| 2011/0304240 A1 | 12/2011 | Meitav | |
| 2012/0063091 A1 | 3/2012 | Dede | |
| 2012/0171062 A1 * | 7/2012 | Kodama | F04B 45/047 417/413.2 |
| 2012/0301333 A1 | 11/2012 | Smirnov | |
| 2013/0058818 A1 | 3/2013 | Hirata | |
| 2013/0071269 A1 | 3/2013 | Fujisaki | |
| 2013/0157729 A1 | 6/2013 | Tabe | |
| 2013/0225065 A1 | 8/2013 | Lee | |
| 2013/0233523 A1 | 9/2013 | Parida | |
| 2014/0052429 A1 | 2/2014 | Kelkar | |
| 2014/0192485 A1 | 7/2014 | Rau | |
| 2014/0216696 A1 * | 8/2014 | Donnelly | H01L 23/467 165/121 |
| 2015/0007965 A1 | 1/2015 | Joshi | |
| 2015/0009631 A1 | 1/2015 | Joshi | |
| 2015/0043164 A1 | 2/2015 | Joshi | |
| 2015/0173237 A1 | 6/2015 | Lin | |
| 2015/0308377 A1 | 10/2015 | Packard | |
| 2016/0025429 A1 | 1/2016 | Muir | |
| 2016/0076530 A1 | 3/2016 | Chen | |

(56) References Cited

U.S. PATENT DOCUMENTS

| | | |
|---|---|---|
| 2016/0343637 A1 | 11/2016 | Axelrod |
| 2016/0353186 A1 | 12/2016 | Rothkopf |
| 2016/0358841 A1 | 12/2016 | Eid |
| 2016/0377072 A1 | 12/2016 | Wu |
| 2016/0377073 A1 | 12/2016 | Tanaka |
| 2017/0146039 A1 | 5/2017 | Lin |
| 2017/0222123 A1 | 8/2017 | Chen |
| 2017/0276149 A1* | 9/2017 | Dusseau ............ H05K 7/20136 |
| 2017/0292537 A1 | 10/2017 | Barak |
| 2017/0363076 A1 | 12/2017 | Najafi |
| 2018/0061737 A1 | 3/2018 | Arik |
| 2018/0145010 A1 | 5/2018 | Fukuoka |
| 2018/0146573 A1 | 5/2018 | Chen |
| 2018/0146574 A1 | 5/2018 | Chen |
| 2018/0187672 A1 | 7/2018 | Tanaka |
| 2018/0240734 A1 | 8/2018 | Liao |
| 2019/0062150 A1 | 2/2019 | Moitzi |
| 2019/0067550 A1 | 2/2019 | Mou |
| 2019/0085836 A1 | 3/2019 | Mou |
| 2019/0101938 A1 | 4/2019 | Mou |
| 2019/0309744 A1 | 10/2019 | Ting |
| 2020/0049386 A1 | 2/2020 | Ganti |
| 2020/0053905 A1 | 2/2020 | Ganti |
| 2020/0088185 A1 | 3/2020 | Mou |
| 2020/0229320 A1 | 7/2020 | Mou |
| 2021/0131415 A1 | 5/2021 | Yalamarthy |
| 2021/0144884 A1 | 5/2021 | Mou |
| 2021/0176894 A1 | 6/2021 | Yalamarthy |
| 2021/0176895 A1 | 6/2021 | Mukundan |
| 2021/0180723 A1 | 6/2021 | Mukundan |
| 2021/0183739 A1 | 6/2021 | Sathyamurthy |
| 2021/0185853 A1 | 6/2021 | Ganti |
| 2021/0185856 A1 | 6/2021 | Ganti |
| 2022/0081284 A1 | 3/2022 | Ganti |
| 2022/0087058 A1 | 3/2022 | Sankar |
| 2022/0087064 A1 | 3/2022 | Ganti |
| 2022/0150335 A1 | 5/2022 | Sathyamurthy |
| 2022/0187033 A1 | 6/2022 | Sankar |
| 2022/0189852 A1 | 6/2022 | Sathyamurthy |
| 2022/0282932 A1 | 9/2022 | Sathyamurthy |

FOREIGN PATENT DOCUMENTS

| | | |
|---|---|---|
| CN | 101785103 | 7/2010 |
| CN | 103828050 | 5/2014 |
| CN | 204436756 | 7/2015 |
| CN | 104832407 | 8/2015 |
| CN | 106206490 | 12/2016 |
| CN | 106849747 | 6/2017 |
| CN | 107642483 | 1/2018 |
| CN | 207287973 | 5/2018 |
| CN | 109641738 | 4/2019 |
| CN | 113898563 | 4/2022 |
| EP | 3290211 | 3/2018 |
| EP | 3327295 | 8/2021 |
| JP | S59152793 | 8/1984 |
| JP | H09246766 | 9/1997 |
| JP | 2000323882 | 11/2000 |
| JP | 2001119181 | 4/2001 |
| JP | 2002130198 | 5/2002 |
| JP | 2008159688 | 7/2008 |
| JP | 2008525709 | 7/2008 |
| JP | 2008263830 | 11/2008 |
| JP | 2010029759 | 2/2010 |
| JP | 2011144743 | 7/2011 |
| JP | 2013223818 | 10/2013 |
| JP | 2018022868 | 2/2018 |
| JP | 2018085510 | 5/2018 |
| JP | 2018085511 | 5/2018 |
| KR | 20050026992 | 3/2005 |
| KR | 20070063029 | 6/2007 |
| TW | 200635493 | 10/2006 |
| TW | 201638469 | 11/2016 |
| TW | M542326 | 5/2017 |
| TW | 201814772 | 4/2018 |
| WO | 2014024608 | 2/2014 |

OTHER PUBLICATIONS

Liu et al., Application Prospects of Microfluidics Technology in Electronic Chip Cooling Research, Cryo & Supercond, vol. 37, No. 9, Sep. 16, 2009.

H.Q. Li, "A High Frequency High Flow Rate Piezoelectrically Driven Mems Micropump", Solid-State Sensors, Actuators, and Microsystems Workshop, Jun. 4-8, 2000, pp. 69-72.

* cited by examiner

MEMS-BASED AIRFLOW SYSTEM HAVING A VIBRATING FAN ELEMENT ARRANGEMENT

CROSS REFERENCE TO OTHER APPLICATIONS

This application claims priority to U.S. Provisional Patent Application No. 62/928,209 entitled MEMS-BASED PIEZEOELCTRIC FAN filed Oct. 30, 2019 which is incorporated herein by reference for all purposes.

BACKGROUND OF THE INVENTION

As computing devices grow in speed and computing power, the heat generated by the computing devices also increases. Various mechanisms have been proposed to address the generation of heat. Active devices, such as fans, may be used to drive air through large computing devices, such as laptop computers or desktop computers. However, such active and devices may be unable to be used in the context mobile devices such as smartphones and may be inadequate in larger devices such as laptops and desktop computers. Consequently, additional heat management solutions for computing devices are desired.

BRIEF DESCRIPTION OF THE DRAWINGS

Various embodiments of the invention are disclosed in the following detailed description and the accompanying drawings.

DETAILED DESCRIPTION

Figure 1A:
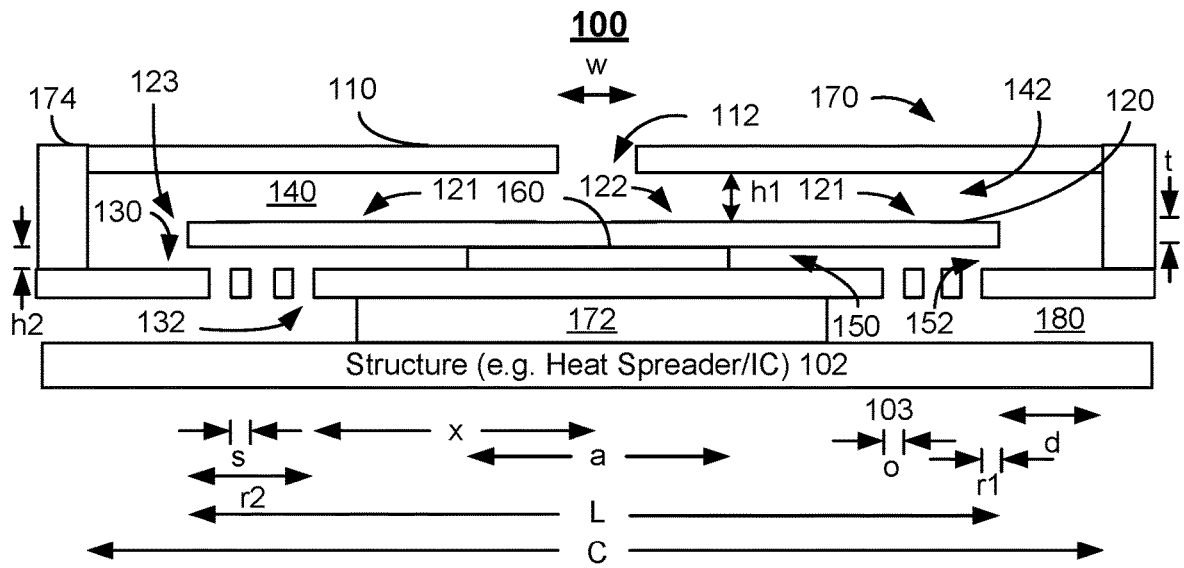
FIGS. 1A-1F depict an embodiment of an active system including fan elements usable in a device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As components in computing devices, such as semiconductor devices, become increasingly powerful, the heat generated during operation grows. For example, computing devices such as mobile devices (e.g. smartphones, tablet computers, notebook computers, and virtual reality devices) and networking devices (e.g. servers) produce a significant amount of heat. In order to manage heat generated, the movement of fluid, such as air, may be used. For larger devices, such as laptop or desktop computers, fans having rotating blades can be used to drive air through the larger devices. However, such fans are typically too large for some devices such as smartphones or tablet computers. Fans also may have limited efficacy because of the boundary layer of air existing at the surface of the components, provide a limited airspeed for air flow across the hot surface desired to be cooled and may generate an excessive amount of noise. Consequently, additional solutions for driving fluids are desired in computing and other applications.

A system that drives a fluid is disclosed. The system includes an orifice plate, a fan element and at least one channel. The orifice plate has at least one orifice therein. The fan element is configured to undergo vibrational motion to drive a fluid through the orifice(s). The fluid is drawn through the channel(s) in response to the fluid being driven through the at least one orifice. In some embodiments, the vibrational motion driving the fluid through the orifices provides a low pressure region proximate to the orifice plate.

The fluid is drawn through the channel(s) in response to the low pressure region being formed.

In some embodiments, the system includes a support structure. The fan element has multiple edges, at least one of which is anchored to the support structure such that an edge of the plurality of edges is free to vibrate. In some such embodiments, a border of the channel is defined by the fan element. Further, the orifice plate is proximate to the edge of the fan element. The fluid flows substantially parallel to a surface of the fan element.

In some embodiments, the fan element includes anchored edges such that a central portion of the fan element undergoes the vibrational motion. A jet channel may also be included in the device. The fluid flows through the channel being in a direction substantially perpendicular to the jet channel. An edge of the jet channel is formed by a jet channel wall. The jet channel wall has an aperture therein. Thus, the channel and the jet channel are configured such that the fluid is driven through the aperture.

The device may include an additional fan element. The additional fan element has an additional plurality of anchored sides such that an additional central portion of the additional fan element undergoes an additional vibrational motion. The additional vibrational motion of the additional fan element may be out-of-phase with the vibrational motion of the fan element.

In some embodiments, a system including a plurality of cells is described. Each of the cells includes an orifice plate (which may be shared between cells), a fan element, and at least one channel. The orifice plate has orifice(s) therein. The fan element is configured to undergo vibrational motion to drive a fluid through the orifice(s). The fluid is drawn through the channel(s) in response to the fluid being driven through the at least one orifice. In some embodiments, the vibrational motion driving the fluid through the orifices provides a low pressure region proximate to the orifice plate. The fluid is drawn through the channel(s) in response to the low pressure region being formed. In some embodiments, the device includes a support structure and the fan element includes edges. At least one of the edges is anchored to the support structure such that an edge of the plurality of edges is free to vibrate. In some such embodiments, a border of the channel is defined by the fan element and the orifice plate is proximate to the edge. In such embodiments, the fluid flows substantially parallel to a surface of the fan element. In some embodiments, the fan element includes anchored edges such that a central portion of the fan element undergoes the vibrational motion. In some embodiments, the device includes a jet channel. The fluid flowing through the channel being is in a direction substantially perpendicular to the jet channel.

A method for moving fluid includes driving a fan element and using feedback. The fan element is driven to undergo vibrational motion to drive a fluid through orifice(s) of an orifice plate. The fluid is drawn through channel(s) in response to the fluid being driven through the orifice(s). Feedback is used to control a frequency of the vibrational motion. In some embodiments, driving the fluid through the orifices provides a low pressure region proximate to the orifice plate. The fluid being drawn through the at least one channel in response to the low pressure region being formed.

Figure 1B:
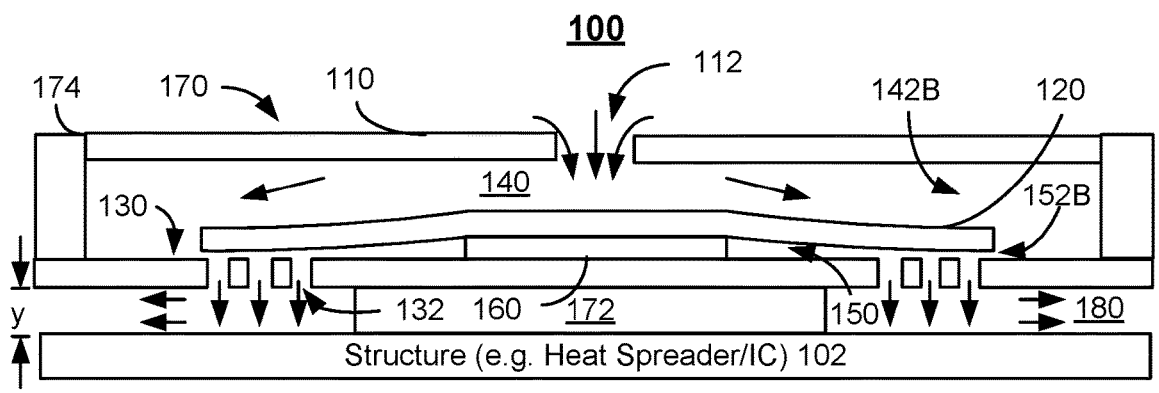
Figure 1C:
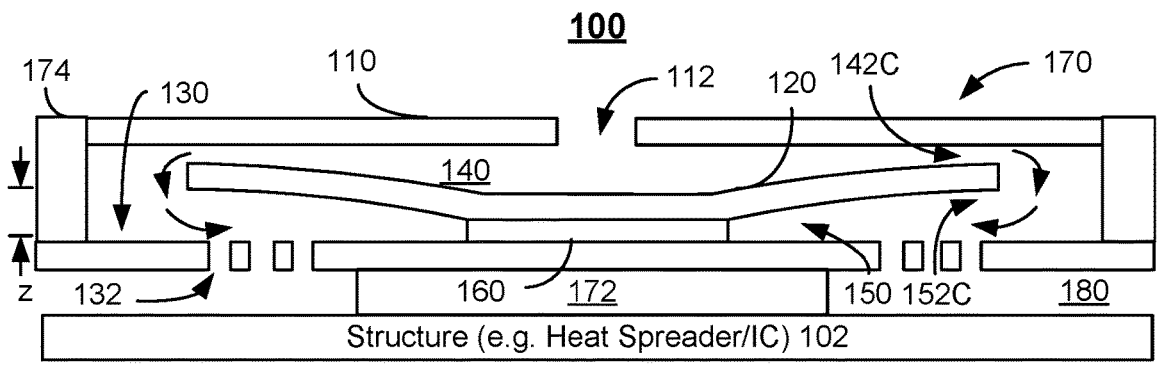
Figure 1D:
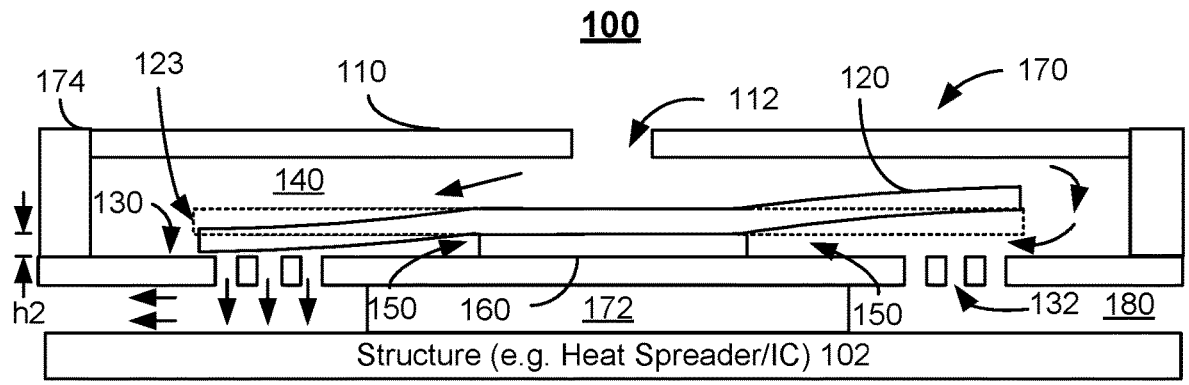
Figure 1E:
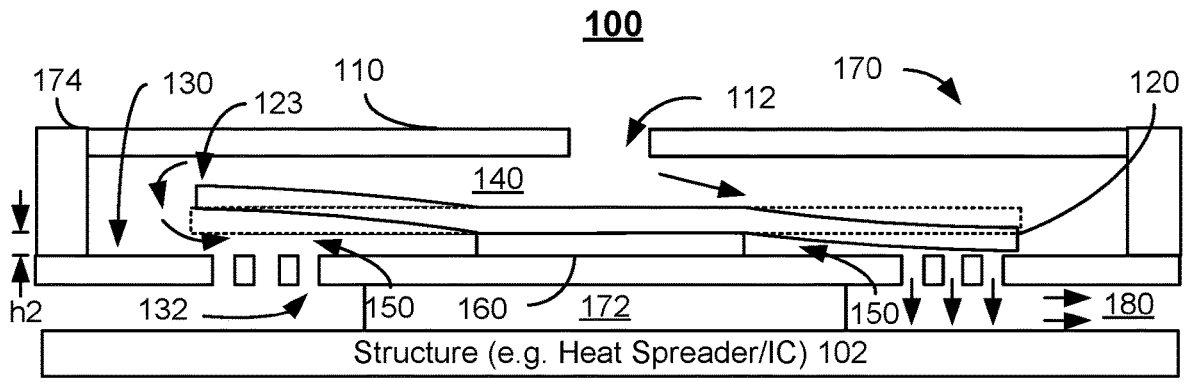
Figure 1F:
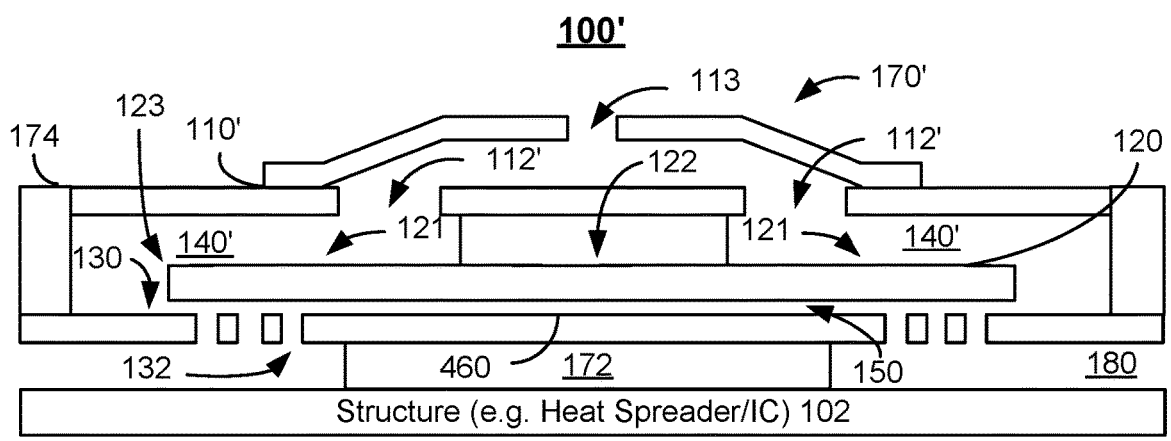

FIGS. 1A-1F are diagrams depicting exemplary embodiments of active systems 100 and 100' usable with structure 102. For clarity, only certain components are shown. FIGS. 1A-1F are not to scale. Although shown as symmetric, system(s) 100 and/or 100' need not be. FIGS. 1A-1E depict various modes of one embodiment of a system. FIG. 1F depicts another embodiment of a system 100'.

System 100 includes fan element 120 and support structure 170. In the embodiment shown in FIGS. 1A-1E, support structure 170 includes top plate 110 having vent 112 therein, orifice plate 130 having orifices 132 therein, anchor 160, pedestal 172 and sidewalls 174. Fan element 120 divides the interior of support structure 170 into top chamber 140 and bottom chamber 150. Chambers 140 and 150 (collectively chamber 140/150) are formed within orifice, or bottom, plate 130, top plate 110 and sidewalls 174. Support structure is thermally coupled to structure 102 via pedestal 172. Pedestal 172 also provides a space, or jet channel 180 for fluid to flow between orifice plate 130 and structure 102. In some embodiments, pedestal 172 may be replaced or augmented by pedestal(s) (not shown) at the edges of a cell 100. Further, structure 102 may be removed or placed a greater distance from orifice plate 130.

Fan element 120 is supported at its central region by anchor 160. Regions of fan element 120 closer to and including portions of the fan element's perimeter (e.g. tip 123) vibrate when actuated. In some embodiments, tip 123 of fan element 120 includes a portion of the perimeter furthest from anchor 160 and undergoes the largest deflection during actuation of fan element 120. For clarity, only one tip 123 of fan element 120 is labeled in FIG. 1A.

FIG. 1A depicts system 100 in a neutral position. Thus, fan element 120 is shown as substantially flat. For in-phase operation, fan element 120 is driven to vibrate between positions shown in FIGS. 1B and 1C. This vibrational motion draws fluid (e.g. air) into vent 112, through chambers 140 and 150 and out orifices 132 at high speed and/or flow rates. For example, the speed at which the fluid impinges on structure 102 may be at least thirty meters per second. In some embodiments, the fluid is driven by fan element 120 toward structure 102 at a speed of at least forty-five meters per second. In some embodiments, the fluid is driven toward structure 102 by fan element 120 at speeds of at least sixty meters per second. Other speeds may be possible in some embodiments. System 100 is also configured so that little or no fluid is drawn back into chamber 140/150 through orifices 132 by the vibrational motion of fan element 120.

The devices in which system 100 is desired to be used may also have limited space in which to place a system. For example, system 100 may be used in computing devices. Such computing devices may include but are not limited to smartphones, tablet computers, laptop computers, tablets, two-in-one laptops, hand held gaming systems, digital cameras, virtual reality headsets, augmented reality headsets, mixed reality headsets and other devices that are thin. In some embodiments, the computing device in which system 100 is used need not be thin. For example, servers, desktop computers and/or other larger computing systems may also be cooled using system 100. System 100 may be a micro-electro-mechanical system (MEMS) system capable of residing within mobile computing devices and/or other devices having limited space in at least one dimension. For example, the total height of system 100 (from the top of structure 102 or bottom of orifice plate 130 to the top of top plate 110) may be less than 2 millimeters. In some embodiments, the total height of system 100 is not more than 1.5 millimeters. In some embodiments, the total height does not exceed two hundred and fifty micrometers. In some embodiments, this total height is not more than 1.1 millimeters. In some embodiments, the total height does not exceed one millimeter. Thus, system 100 is usable in computing devices and/or other devices having limited space in at least one dimension. However, nothing prevents the use of system 100 in devices having fewer limitations on space and/or for purposes other than cooling or driving airflow. Although one system 100 is shown (e.g. one cell), multiple cells 100 might be used. For example, a one or two-dimensional array of cells might be utilized.

In some embodiments, the distance between the bottom of orifice plate 130 and the top of structure 102, y, may be small. In some embodiments, y is at least two hundred micrometers and not more than one millimeter. In some embodiments, y is at least two hundred micrometers and not more than three hundred micrometers. In such embodiments, structure 102 may be desired to be cooled. However, in other embodiments, y may be larger. In some embodiments, structure 102 may be significantly further from orifice plate 130, as described below. More specifically, when used to entrain fluid, structure 102 may be further from orifice plate 130 or be omitted.

System 100 is in communication with a fluid. The fluid may be a gas or a liquid. For example, the fluid may be air. In some embodiments, the fluid includes fluid from outside of the device in which system 100 resides (e.g. provided through external vents in the device). In some embodiments, the fluid circulates within the device in which system resides (e.g. in an enclosed device).

Fan element 120 can be considered to divide the interior of active system 100 into top chamber 140 and bottom chamber 150. Top chamber 140 is formed by fan element 120, the sides, and top plate 110. Bottom chamber 150 is formed by orifice plate 130, the sides, fan element 120 and anchor 160. Top chamber 140 and bottom chamber 150 are connected at the periphery of fan element 120 and together form chamber 140/150 (e.g. an interior chamber of system 100).

The size and configuration of top chamber 140 may be a function of the cell (system 100) dimensions, fan element 120 motion, and the frequency of operation. Top chamber 140 has a height, h1. The height of top chamber 140 may be selected to provide sufficient pressure to drive the fluid to bottom chamber 150 and through orifices 132 at the desired flow rate and/or speed. Top chamber 140 is also sufficiently tall that fan element 120 does not contact top plate 110 when actuated. In some embodiments, the height of top chamber 140 is at least fifty micrometers and not more than five hundred micrometers. In some embodiments, top chamber 140 has a height of at least two hundred and not more than three hundred micrometers.

Bottom chamber 150 has a height, h2. In some embodiments, the height of bottom chamber 150 is sufficient to accommodate the motion of fan element 120. Thus, no portion of fan element 120 contacts orifice plate 130 during normal operation. Bottom chamber 150 is generally smaller than top chamber 140 and may aid in reducing the backflow of fluid into orifices 132. In some embodiments, the height of bottom chamber 150 is the maximum deflection of fan element 120 plus at least five micrometers and not more than ten micrometers. In some embodiments, the deflection of fan element 120 (e.g. the deflection of tip 123), z, has an amplitude of at least ten micrometers and not more than one hundred micrometers. In some such embodiments, the amplitude of deflection of fan element 120 is at least ten micrometers and not more than sixty micrometers. However, the amplitude of deflection of fan element 120 depends on factors such as the desired flow rate through system 100 and the configuration of system 100. Thus, the height of bottom chamber 150 generally depends on the flow rate through and other components of system 100.

Top plate 110 includes vent 112 through which fluid may be drawn into system 100. Top vent 112 may have a size chosen based on the desired acoustic pressure in chamber 140. For example, in some embodiments, the width, w, of vent 112 is at least five hundred micrometers and not more than one thousand micrometers. In some embodiments, the width of vent 112 is at least two hundred fifty micrometers and not more than two thousand micrometers. In the embodiment shown, vent 112 is a centrally located aperture in top plate 110. In other embodiments, vent 112 may be located elsewhere. For example, vent 112 may be closer to one of the edges of top plate 110. Vent 112 may have a circular, rectangular or other shaped footprint. Although a single vent 112 is shown, multiple vents might be used. For example, vents may be offset toward the edges of top chamber 140 or be located on the side(s) of top chamber 140. Although top plate 110 is shown as substantially flat, in some embodiments trenches and/or other structures may be provided in top plate 110 to modify the configuration of top chamber 140 and/or the region above top plate 110. In some embodiments, vent 112 may be omitted.

Fan element 120 includes an anchored region 122 and cantilevered arms 121. For simplicity, anchored region 122 and cantilevered arms 121 are only labeled in FIGS. 1A and 1F. Anchored region 122 is supported (e.g. held in place) in system 100 by anchor 160. Cantilevered arms 121 undergo vibrational motion in response to fan element 120 being actuated. In the embodiment shown in FIGS. 1A-1F, anchored region 122 is centrally located. In other embodiments, anchored region 122 may be at one edge of the actuator and an outer region including vibrating tip 123 at the opposing edge. In such embodiments, fan element 120 is edge anchored. Although depicted as having a uniform thickness, in some embodiments, fan element 120 may have a varying thickness.

Anchor 160 supports fan element 120 at the central portion of fan element 120. Thus, at least part of the perimeter of fan element 120 is unpinned and free to vibrate. In some embodiments, anchor 160 extends along a central axis of fan element 120 (e.g. perpendicular to the page in FIGS. 1A-1F). In such embodiments, portions of fan element 120 that vibrate (e.g. cantilevered arms 121 including tip 123) move in a cantilevered fashion. Thus, cantilevered arms 121 of fan element 120 may move in a manner analogous to the wings of a butterfly (i.e. in-phase) and/or analogous to a seesaw (i.e. out-of-phase). Thus, the cantilevered arms 121 of fan element 120 that vibrate in a cantilevered fashion do so in-phase in some embodiments and out-of-phase in other embodiments. In some embodiments, anchor 160 does not extend along an axis of fan element 120. In such embodiments, all portions of the perimeter of fan element 120 are free to vibrate (e.g. analogous to a jellyfish). In the embodiment shown, anchor 160 supports fan element 120 from the bottom of fan element 120. In other embodiments, anchor 160 may support fan element 120 in another manner. For example, anchor 160 may support fan element 120 from the top (e.g. fan element 120 hangs from anchor 160). In some embodiments, the width, a, of anchor 160 is at least 0.5 millimeters and not more than four millimeters. In some embodiments, the width of anchor 160 is at least two millimeters and not more than 2.5 millimeters. Anchor 160 may occupy at least ten percent and not more than fifty percent of fan element 120. In some embodiments, anchor 160 may be omitted. In such embodiments (described below), fan element 120 is supported at one or more of its edges. In such embodiments, fan element 120 operates as a cantilevered arm or may be pinned at multiple edges such that the central portion of fan element 120 vibrates.

Fan element 120 has a first side and a second side. In some embodiments, the first side is distal from structure 102 and the second side is proximate to structure 102. In the embodiment shown in FIGS. 1A-1F, the first side of fan element 120 is the top of fan element 120 (closer to top plate 110) and the second side is the bottom of fan element 120 (closer to orifice plate 130). Fan element 120 is actuated to undergo vibrational motion as shown in FIGS. 1A-1F. The vibrational motion of fan element 120 drives fluid from the first side of fan element 120 (e.g. distal from structure 102/from top chamber 140) to a second side of fan element 120 (e.g. proximate to structure 102/to bottom chamber 150). The vibrational motion of fan element 120 draws fluid through vent 112 and into top chamber 140; forces fluid from top chamber 140 to bottom chamber 150; and drives fluid from bottom chamber 150 through orifices 132 of orifice plate 130.

Fan element 120 has a length, L, that depends upon the frequency at which fan element 120 is desired to vibrate. In some embodiments, the length of fan element 120 is at least four millimeters and not more than ten millimeters. In some such embodiments, fan element 120 has a length of at least six millimeters and not more than eight millimeters. The depth of fan element 120 (e.g. perpendicular to the plane shown in FIGS. 1A-1F) may vary from one fourth of L through twice L. For example, fan element 120 may have the same depth as length. The thickness, t, of fan element 120 may vary based upon the configuration of fan element 120 and/or the frequency at which fan element 120 is desired to be actuated. In some embodiments, the fan element thickness is at least two hundred micrometers and not more than three hundred and fifty micrometers for fan element 120 having a length of eight millimeters and driven at a frequency of at least twenty kilohertz and not more than twenty-five kilohertz. The length, C of chamber 140/150 is close to the length, L, of fan element 120. For example, in some embodiments, the distance, d, between the edge of fan element 120 and the wall of chamber 140/50 is at least one hundred micrometers and not more than five hundred micrometers. In some embodiments, d is at least two hundred micrometers and not more than three hundred micrometers. Fan element 120 may have a substantially rectangular footprint in the embodiment shown. Other footprints are possible. For example, if all edges of fan element 120 are free to vibrate (e.g. in a manner analogous to a jellyfish) or if all edges of fan element 120 are anchored (e.g. such that the central portion undergoes vibration), then fan element 120 may have a substantially circular footprint.

Fan element 120 may be driven at a frequency that is at or near both the resonant frequency for an acoustic resonance of a pressure wave of the fluid in top chamber 140 and the resonant frequency for a structural resonance of fan element 120. The portion of fan element 120 undergoing vibrational motion is driven at or near resonance (the "structural resonance") of fan element 120. This portion of fan element 120 undergoing vibration may be cantilevered arm(s) 121 in some embodiments. The frequency of vibration for structural resonance is termed the structural resonant frequency. Use of the structural resonant frequency in driving fan element 120 reduces the power consumption of system 100. Fan element 120 and top chamber 140 may also be configured such that this structural resonant frequency corresponds to a resonance in a pressure wave in the fluid being driven through top chamber 140 (the acoustic resonance of top chamber 140). The frequency of such a pressure wave is termed the acoustic resonant frequency. At acoustic resonance, a node in pressure occurs near vent 112 and an antinode in pressure occurs near the periphery of system 100 (e.g. near tip 123 of fan element 120 and near the connection between top chamber 140 and bottom chamber 150). The distance between these two regions is at or near C/2. Thus, $C/2=n\lambda/4$, where $\lambda$ is the acoustic wavelength for the fluid and n is odd (e.g. n=1, 3, 5, etc.). For the lowest order mode, $C=\lambda/2$. Because the length of chamber 140 (e.g. C) is close to the length of fan element 120, in some embodiments, it is also approximately true that $L/2=n\lambda/4$, where $\lambda$ is the acoustic wavelength for the fluid and n is odd. Thus, the frequency at which fan element 120 is driven, $v$, is at or near the structural resonant frequency for fan element 120. The frequency $v$ is also at or near the acoustic resonant frequency for at least top chamber 140. The acoustic resonant frequency of top chamber 140 generally varies less dramatically with parameters such as temperature and size than the structural resonant frequency of fan element 120. Consequently, in some embodiments, fan element 120 may be driven at (or closer to) a structural resonant frequency than to the acoustic resonant frequency.

Orifice plate 130 has orifices 132 therein. Although a particular number and distribution of orifices 132 are shown, another number, other location(s) and/or another distribution may be used. A single orifice plate 130 is used for a single system 100. In other embodiments, multiple systems 100 may share an orifice plate. For example, multiple cells 100 may be provided together in a desired configuration. In such embodiments, the cells 100 may be the same size and configuration or different size(s) and/or configuration(s). Orifices 132 are shown as having an axis oriented normal to a surface of structure 102. In other embodiments, the axis of one or more orifices 132 may be at another angle. For example, the angle of the axis may be selected from substantially zero degrees and a nonzero acute angle. Orifices 132 also have sidewalls that are substantially parallel to the normal to the surface of orifice plate 130. In some embodiments, orifices may have sidewalls at a nonzero angle to the normal to the surface of orifice plate 130. For example, orifices 132 may be cone-shaped. Further, although orifice place 130 is shown as substantially flat, in some embodiments, trenches and/or other structures may be provided in orifice plate 130 to modify the configuration of bottom chamber 150 and/or the region between orifice plate 130 and structure 102.

The size, distribution and locations of orifices 132 are chosen to control the flow rate of fluid driven to the surface of structure 102. The locations and configurations of orifices 132 may be configured to increase/maximize the fluid flow from bottom chamber 150 through orifices 132 to jet channel 180. The locations and configurations of orifices 132 may also be selected to reduce/minimize the suction flow (e.g. back flow) from jet channel 180 through orifices 132. For example, the locations of orifices are desired to be sufficiently far from tip 123 that suction in the upstroke of fan element 120 (tip 123 moves away from orifice plate 13) that would pull fluid into bottom chamber 150 through orifices 132 is reduced. The locations of orifices are also desired to be sufficiently close to tip 123 that suction in the upstroke of fan element 120 also allows a higher pressure from top chamber 140 to push fluid from top chamber 140 into bottom chamber 150. In some embodiments, the ratio of the flow rate from top chamber 140 into bottom chamber 150 to the flow rate from jet channel 180 through orifices 132 in the upstroke (the "net flow ratio") is greater than 2:1. In some embodiments, the net flow ratio is at least 85:15. In some embodiments, the net flow ratio is at least 90:10. In order to provide the desired pressure, flow rate, suction, and net flow ratio, orifices 132 are desired to be at least a distance, r1, from tip 123 and not more than a distance, r2, from tip 123 of fan element 120. In some embodiments r1 is at least one hundred micrometers (e.g. r1≥100 μm) and r2 is not more than one millimeter (e.g. r2≤1000 μm). In some embodiments, orifices 132 are at least two hundred micrometers from tip 123 of fan element 120 (e.g. r1≥200 μm). In some such embodiments, orifices 132 are at least three hundred micrometers from tip 123 of fan element 120 (e.g. r1≥300 μm). In some embodiments, orifices 132 have a width of at least one hundred micrometers and not more than five hundred micrometers. In some embodiments, orifices 132 have a width of at least two hundred micrometers and not more than three hundred micrometers. In some embodiments, the orifice separation, s, is at least one hundred micrometers and not more than one millimeter. In some such embodiments, the orifice separation is at least four hundred micrometers and not more than six hundred micrometers. In some embodiments, orifices 132 are also desired to occupy a particular fraction of the area of orifice plate 130. For example, orifices 132 may cover at least five percent and not more than fifteen percent of the footprint of orifice plate 130 in order to achieve a desired flow rate of fluid through orifices 132. In some embodiments, orifices 132 cover at least eight percent and not more than twelve percent of the footprint of orifice plate 130.

In some embodiments, fan element 120 is actuated using a piezoelectric. Thus, fan element 120 may be a piezoelectric fan element. Fan element 120 may be driven by a piezoelectric that is mounted on or integrated into fan element 120. In some embodiments, fan element 120 is driven in another manner including but not limited to providing a piezoelectric on another structure in system 100. Fan element 120 and analogous fan elements are referred to hereinafter as piezoelectric fan element though it is possible that a mechanism other than a piezoelectric might be used to drive the fan element. In some embodiments, fan element 120 includes a piezoelectric layer on substrate. The substrate may be a stainless steel, Ni alloy and/or Hastelloy substrate. In some embodiments, piezoelectric layer includes multiple sublayers formed as thin films on the substrate. In other embodiments, the piezoelectric layer may be a bulk layer affixed to the substrate. Such a piezoelectric fan element 120 also includes electrodes used to activate the piezoelectric. The substrate functions as an electrode in some embodiments. In other embodiments, a bottom electrode may be provided between the substrate and the piezoelectric layer. Other layers including but not limited to seed, capping, passivation or other layers might be included in piezoelectric fan element. Thus, fan element 120 may be actuated using a piezoelectric.

Operation of system 100 is described in the context of FIGS. 1A-1E. Although described in the context of particular pressures, gap sizes, and timing of flow, operation of system 100 is not dependent upon the explanation herein. FIGS. 1B-1C depict in-phase operation of system 100. Referring to FIG. 1B, fan element 120 has been actuated so that cantilevered arms 121 and tip 123 move away from top plate 110. FIG. 1B can thus be considered to depict the end of a down stroke of fan element 120. Because of the vibrational motion of fan element 120, gap 152 for bottom chamber 150 has decreased in size and is shown as gap 152B. Conversely, gap 142 for top chamber 140 has increased in size and is shown as gap 142B. During the down stroke, a lower (e.g. minimum) pressure is developed at the periphery when fan element 120 is at the neutral position. As the down stroke continues, bottom chamber 150 decreases in size and top chamber 140 increases in size as shown in FIG. 1C. Thus, fluid is driven out of orifices 132 in a direction that is at or near perpendicular to the surface of orifice plate 130 and/or the top surface of structure 102. The fluid is driven from orifices 132 (and toward structure 102 in the embodiment shown) at a high speed, for example in excess of thirty meters per second. Thus, fluid exits orifices 132 at the high speeds described herein. In some embodiments, the fluid then travels along the surface of structure 102 and toward the periphery of structure 102, where the pressure is lower than near orifices 132. Also in the down stroke, top chamber 140 increases in size and a lower pressure is present in top chamber 140. As a result, fluid is drawn into top chamber 140 through vent 112. The motion of the fluid into vent 112, through orifices 132, and along the surface of structure 102 is shown by unlabeled arrows in FIG. 1C.

Fan element 120 is also actuated so that cantilevered arms 121 and thus tip 123 moves away from structure 102 and toward top plate 110. FIG. 1C can thus be considered to depict the end of an up stroke of fan element 120. Because of the motion of fan element 120, gap 142 has decreased in size and is shown as gap 142C. Gap 152 has increased in size and is shown as gap 152C. During the upstroke, a higher (e.g. maximum) pressure is developed at the periphery when fan element 120 is at the neutral position. As the upstroke continues, bottom chamber 150 increases in size and top chamber 140 decreases in size as shown in FIG. 1C. Thus, the fluid is driven from top chamber 140 (e.g. the periphery of chamber 140/150) to bottom chamber 150. Thus, when tip 123 of fan element 120 moves up, top chamber 140 serves as a nozzle for the entering fluid to speed up and be driven towards bottom chamber 150. The motion of the fluid into bottom chamber 150 is shown by unlabeled arrows in FIG. 1C. The location and configuration of fan element 120 and orifices 132 are selected to reduce suction and, therefore, back flow of fluid from jet channel 180 into orifices 132 during the upstroke. Thus, system 100 is able to drive fluid from top chamber 140 to bottom chamber 150 without an undue amount of backflow of fluid from jet channel 180 entering bottom chamber 10.

The motion between the positions shown in FIGS. 1B and 1C is repeated. Thus, fan element 120 undergoes vibrational motion indicated in FIGS. 1A-1C, drawing fluid through vent 112 from the distal side of top plate 110 into top chamber 140; transferring fluid from top chamber 140 to bottom chamber 150; and pushing the fluid through orifices 132 and toward structure 102. As discussed above, fan element 120 is driven to vibrate at or near the structural resonant frequency of fan element 120. In some embodiments, this corresponds to the structural resonance of cantilevered arms 121. Further, the structural resonant frequency of fan element 120 is configured to align with the acoustic resonance of the chamber 140/150. The structural and acoustic resonant frequencies are generally chosen to be in the ultrasonic range. For example, the vibrational motion of fan element 120 may be at frequencies from 15 kHz through 30 kHz. In some embodiments, fan element 120 vibrates at a frequency/frequencies of at least 20 kHz and not more than 30 kHz. The structural resonant frequency of fan element 120 is within ten percent of the acoustic resonant frequency of system 100. In some embodiments, the structural resonant frequency of fan element 120 is within five percent of the acoustic resonant frequency of system 100. In some embodiments, the structural resonant frequency of fan element 120 is within three percent of the acoustic resonant frequency of system 100. Consequently, efficiency and flow rate may be enhanced. However, other frequencies may be used.

Fluid driven through orifices 132 in orifice plate 130 may move substantially normal (perpendicular) to the bottom surface of orifice plate 130 (e.g. substantially perpendicular to the top surface of structure 102). In some embodiments, the fluid motion may have a nonzero acute angle with respect to the normal to the bottom surface of orifice plate 130 (e.g. to top surface of structure 102).

FIGS. 1D-1E depict an embodiment of active system 100 including centrally anchored fan element 120 in which the fan element is driven out-of-phase. More specifically, cantilevered arms 121 of fan element 120 on opposite sides of anchor 160 (and thus on opposite sides of the central, anchored region 122 of fan element 120 that is supported by anchor 160) are driven to vibrate out-of-phase. In some embodiments, cantilevered arms 121 of fan element 120 on opposite sides of anchor 160 are driven at or near one hundred and eighty degrees out-of-phase. Thus, one cantilevered arm 121 of fan element 120 vibrates toward top plate 110, while the other cantilevered arm 121 of fan element 120 vibrates toward orifice plate 130/structure 102. Movement of a cantilevered arms 121 of fan element 120 toward top plate 110 (an upstroke) drives fluid in top chamber 140 to bottom chamber 150 on that side of anchor 160. Movement of a section of fan element 120 toward orifice plate 130 drives fluid through orifices 132 and toward structure 102. Thus, fluid traveling at high speeds (e.g. speeds described with respect to in-phase operation) is alternately driven out of orifices 132 on opposing sides of anchor 160. The movement of fluid is shown by unlabeled arrows in FIGS. 1D and 1E.

The motion between the positions shown in FIGS. 1D and 1E is repeated. Thus, fan element 120 undergoes vibrational motion indicated in FIGS. 1A, 1D, and 1E, alternately drawing fluid through vent 112 from the distal side of top plate 110 into top chamber 140 for each side of fan element 120; transferring fluid from each side of top chamber 140 to the corresponding side of bottom chamber 150; and pushing the fluid through orifices 132 on each side of anchor 160 and toward structure 102. As discussed above, fan element 120 is driven to vibrate at or near the structural resonant frequency of fan element 120. Further, the structural resonant frequency of fan element 120 is configured to align with the acoustic resonance of the chamber 140/150. The structural and acoustic resonant frequencies are generally chosen to be in the ultrasonic range. For example, the vibrational motion of fan element 120 may be at the frequencies described for in-phase vibration. The structural resonant frequency of fan element 120 is within ten percent of the acoustic resonant frequency of system 100. In some embodiments, the structural resonant frequency of fan element 120 is within five percent of the acoustic resonant frequency of system 100. In some embodiments, the structural resonant frequency of fan element 120 is within three percent of the acoustic resonant frequency of system 100. Consequently, efficiency and flow rate may be enhanced. However, other frequencies may be used. Fluid driven toward structure 102 for out-of-phase vibration may move substantially normal (perpendicular) to the bottom surface of orifice plate, in a manner analogous to that described above for in-phase operation.

Using the system 100 actuated for in-phase vibration or out-of-phase vibration, fluid is drawn in through vent 112 and driven through orifices 132 at high speed (e.g. at least thirty meters per second). Because fan element 120 may be vibrated at frequencies of 15 kHz or more, users may not hear any noise associated with actuation of fan elements. If driven at or near structural and/or acoustic resonant frequencies, the power used in operating systems may be significantly reduced. Fan element 120 does not physically contact top plate 110 or orifice plate 130 during vibration. Thus, resonance of fan element 120 may be more readily maintained. More specifically, physical contact between fan element 120 and other structures disturbs the resonance conditions for fan element 120. Disturbing these conditions may drive fan element 120 out of resonance. Thus, additional power would need to be used to maintain actuation of fan element 120. Further, the flow of fluid driven by fan element 120 may decrease. These issues are avoided through the use of pressure differentials and fluid flow as discussed above. The benefits of improved, quiet cooling may be achieved with limited additional power. Further, out-of-phase vibration of fan element 120 allows the position of the center of mass of fan element 100 to remain more stable. Although a torque is exerted on fan element 120, the force due to the motion of the center of mass is reduced or eliminated. As a result, vibrations due to the motion of fan element 120 may be reduced. Moreover, efficiency of system 100 may be improved through the use of out-of-phase vibrational motion for the two sides of fan element 120. For out-of-phase vibration of cantilevered arms 121, vibrations through system 100 may also be reduced. Consequently, performance of devices incorporating the system 100 may be improved. Further, system 100 may be usable in other applications (e.g. with or without structure 102) in which high fluid flows and/or velocities are desired.

FIG. 1F depicts and embodiment of active system 100' including a top centrally anchored fan element. System 100' is analogous to system 100. Consequently, analogous components have similar labels. For example, system 100' may be used in conjunction with structure 102 that is analogous to structure 102.

System 100' includes support structure 170', top plate 110' having vents 112', fan element 120, orifice plate 130 including orifices 132, top chamber 140' having a gap, bottom chamber 150 having a gap, anchor 160 and jet channel 180 that are analogous to support structure 170, top plate 110 having vent 112, fan element 120, orifice plate 130 including orifices 132, top chamber 140 having gap 142, bottom chamber 150 having gap 152, anchor 160 and jet channel 180, respectively, of FIGS. 1A-1E. Thus, fan element 120 is centrally supported by anchor 160 such that at least a portion of the perimeter of fan element 120 is free to vibrate. In some embodiments, anchor 160 extends along the axis of fan element 120 (e.g. in a manner analogous to anchor 360A and/or 360B). In other embodiments, anchor 160 is only near the center portion of fan element 120 (e.g. analogous to anchor 360C and/or 360D). Fan element 120 includes an anchored region 122 and cantilevered arms 121 analogous to anchored region 122 and cantilevered arms 121, respectively of fan element 120 depicted in FIGS. 1A-1E. Cantilevered arms 121 of fan element 120 may be driven in-phase and/or driven out-of-phase.

Anchor 160 supports fan element 120 from above. Thus, fan element 120 is suspended from anchor 160. Anchor 160 is suspended from top plate 110'. Top plate 110' includes vent 113. Vents 112' on the sides of anchor 160 provide a path for fluid to flow into sides of chamber 140'.

As discussed above with respect to system 100, fan element 120 may be driven to vibrate at or near the structural resonant frequency of fan element 120. Further, the structural resonant frequency of fan element 120 may be configured to align with the acoustic resonance of the chamber 140'/150. The structural and acoustic resonant frequencies are generally chosen to be in the ultrasonic range. For example, the vibrational motion of fan element 120 may be at the frequencies described with respect to system 100. Consequently, efficiency and flow rate may be enhanced. However, other frequencies may be used.

System 100' operates in an analogous manner to system 100. System 100' thus shares the benefits of system 100. The use of fan element 120 configured in a manner analogous to fan element 120 may improve efficiency and reliability. In addition, suspending fan element 120 from anchor 160 may further enhance performance. In particular, vibrations in system 100' that may affect other cells (not shown), may be reduced. For example, less vibration may be induced in top plate 110' due to the motion of fan element 120. Consequently, cross talk between system 100' and other systems (e.g. other cells) or other portions of the device incorporating system 100' may be reduced. Thus, performance may be enhanced.

Systems 100 and 100' drive fluid such that fluid exiting orifices 132 has a high speed of at least thirty meters per second. In some embodiments, the fluid exiting orifices 132 has a speed of at least forty-five meters per second. In some embodiments, the fluid exits orifices 132 at speeds of at least sixty meters per second. Other speeds may be possible in some embodiments. Fluid exiting orifices 132 has a high speed in part because the fluid traveling through chambers 140/150 has a high flow rate. In some embodiments, for example, the flow rate through chambers 140/150 may be at least 0.05 cubic feet per minute (cfm). In some embodiments, the flow rate through chambers 140/150 is at least 0.1 cfm. Other (i.e. higher or lower) flow rates are possible. The relatively high flow rates that may be driven through system(s) 100 and/or 100' efficiently remove heat from fan elements 120 and support structure(s) 170 and/or 170'.

Figure 2A:
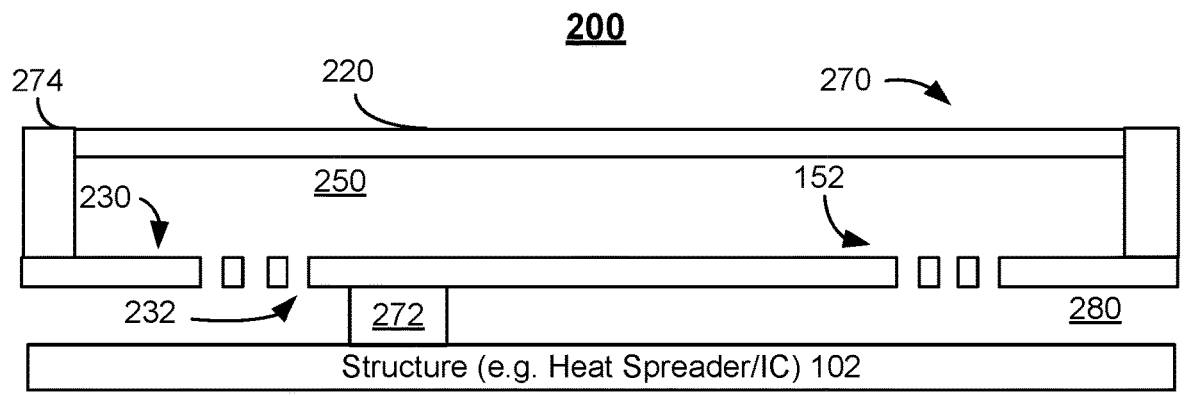
FIGS. 2A-2C depict an embodiment an active system including fan elements usable in a device.
Figure 2B:
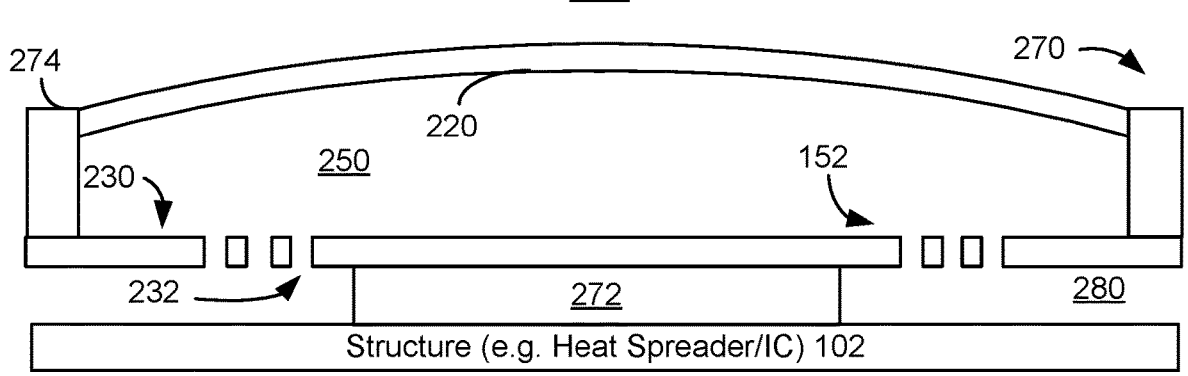
Figure 2C:
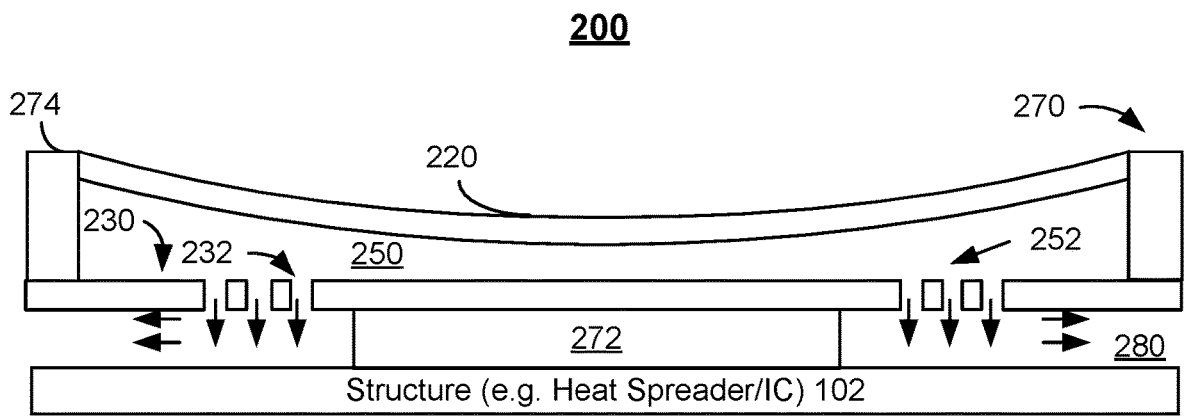

FIGS. 2A-2C depict system 200 that is analogous to system 100. FIG. 2A depicts system 200 in a neutral position. FIG. 2B depicts system 200 in a suction arrangement. FIG. 2C depicts system 200 in an expulsion arrangement. Consequently, analogous components have similar labels. For example, system 200 may be used in conjunction with structure 202 that is analogous to structure 102. System 200 includes support structure 270 having pedestal 272 and sidewalls 274, fan element 220, orifice plate 230 including orifices 232, chamber 250 and jet channel 280 that are analogous to support structure 170 having pedestal 172 and sidewalls 174, top plate 110, fan element 120, orifice plate 130 including orifices 132, bottom chamber 150, and jet channel 180, respectively, of FIGS. 1A-1F. However, in the embodiment shown, support structure 270 does not include a top plate. Further, fan element 220 is anchored at its edges to sidewalls 274. Thus, chamber 250 is formed between orifice plate 230 and fan element 220.

System 200 operations in an analogous manner to systems 100 and/or 100'. In the suction arrangement shown in FIG. 2B, fan element 220 vibrates away from orifice plate 230. This motion enlarges chamber 20. Fan element 220 then vibrates in the opposite direction, in the expulsion mode and shown in FIG. 2C. As indicated by the unlabeled arrows in FIG. 2C, fluid is driven out of orifices 232. In some embodiments, fluid is driven out of orifices 232 at a speed of at least thirty meters per second. In some embodiments, the fluid driven out of orifices 232 has a speed of at least forty-five meters per second. In some embodiments, the fluid has a speed of at least fifty-five meters per second. Further, in some embodiments, fluid speeds of at least sixty meters per section and/or seventy-five meters per second may be achieved. However, higher speeds may be possible in some embodiments.

Figure 3A:
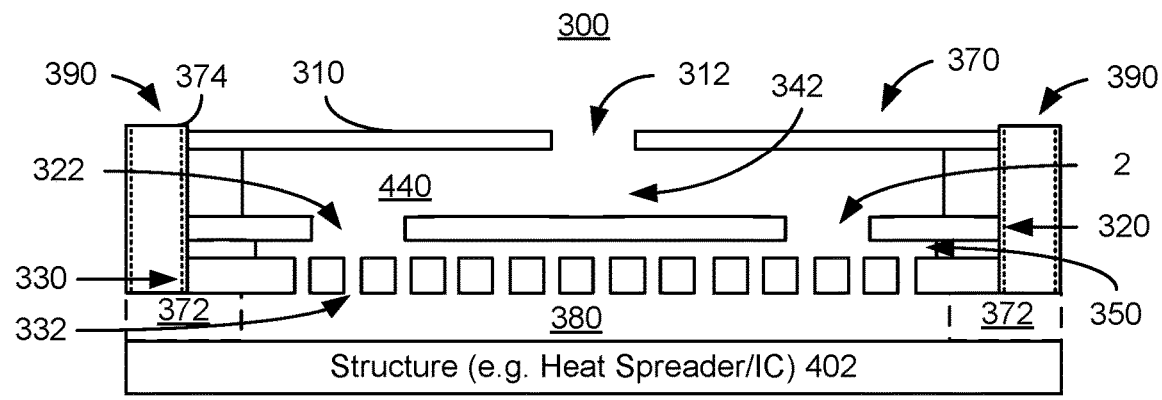
FIGS. 3A-3C are diagrams depicting an embodiment of active system including fan elements usable with in a device.
Figure 3B:
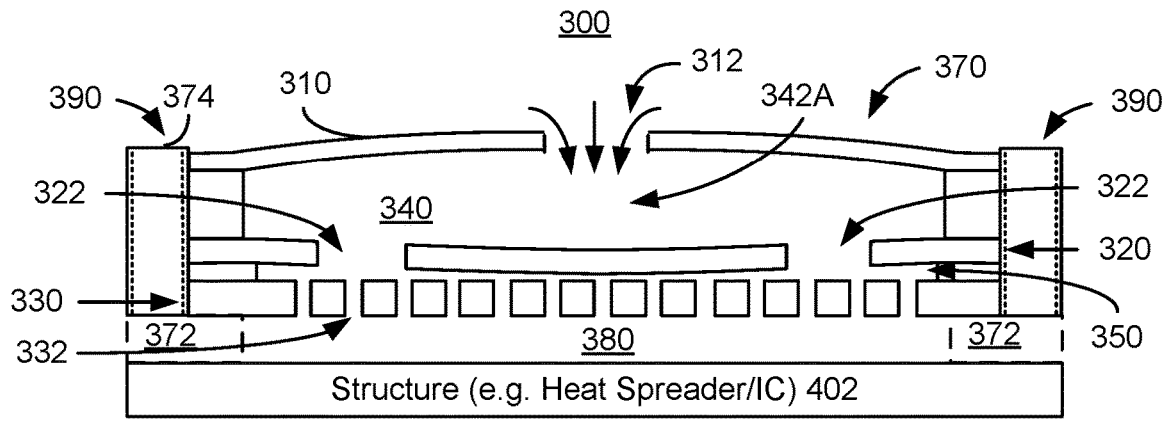
Figure 3C:
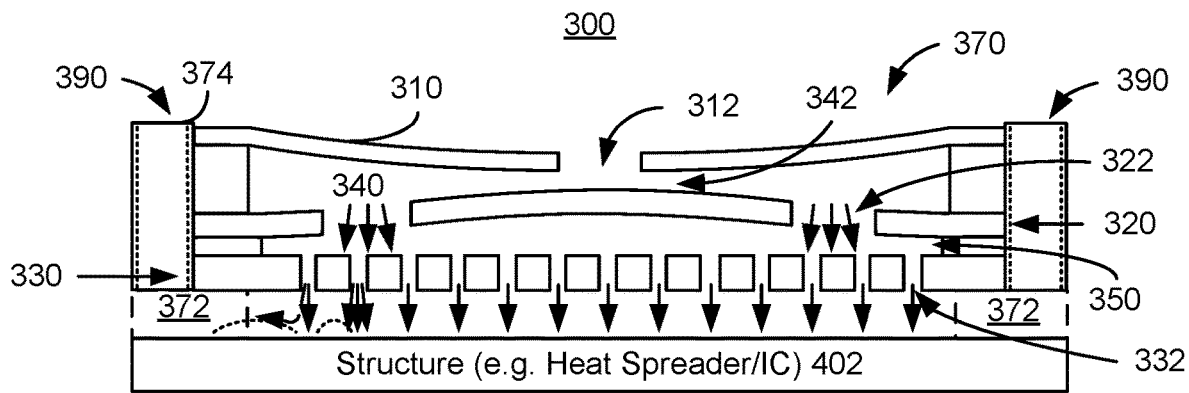

FIGS. 3A-3C are diagrams depicting an exemplary embodiment of active system 300 usable with a structure 302. For clarity, only certain components are shown and FIGS. 3A-3C are not to scale. System 300 is used in connection with a structure 302. Although shown as symmetric, system 300 need not be symmetric.

System 300 is analogous to systems 100 and 200. Consequently, similar components have analogous labels. System 300 includes fan elements 310 and 320 analogous to fan elements 120 and 220. Fan element 310 may be considered to replace top plate 110. System 300 also includes orifice plate 330 having orifices 332 therein, top chamber 340, bottom chamber 350, support structure 370 and jet channel 380 that may be analogous to orifice plates 130 and/or 230 having orifices 132 and/or 232 therein, top chamber 140, bottom chamber 150 and/or 250, support structure 170 and/or 270 and jet channel 180 and/or 280. For simplicity, jet channel 380 is not labeled in FIG. 3C. Support structure 370 includes pedestals 372 and sidewalls 374 that are analogous to pedestals 172 and/or 272 and sidewalls 174 and/or 274. Also shown are optional channels 390 used to entrain fluid, as described below.

Fan element 310 has a first side distal from structure 302 and a second side proximate to structure 302. The first side of fan element 310 is the top of fan element 310 and the second side is the bottom of fan element 310. Fan element 310 also has a passive vent 312 therein. In the embodiment shown, passive vent 312 is a centrally located aperture in fan element 310. In other embodiments, passive vent 312 may be located elsewhere. For example, passive vent 312 may be closer to one of the edges of fan element 310. Passive vent 312 may have a circular, rectangular or other shaped footprint. Although one passive vent 312 is shown, multiple passive vents might be used.

Fan element 320 is between fan element 310 and structure 302. In the embodiment shown, fan element 320 is also between fan element 310 and orifice plate 330. Fan elements 310 and 320 are separated by gap 342 and form a top chamber 340. A bottom chamber 350 is formed between fan element 320 and orifice plate 330. Fan element 320 also has active vents 322 therein. In the embodiment shown, active vents 322 are apertures located away from the central region of fan element 320. In other embodiments, active vents 322 may be located elsewhere. For example, an active vent may be centrally located in fan element 320. Although two active vents 322 are shown, another number (e.g. one, three, etc.) might be present. In some embodiments, active vents 322 are positioned such that the active vents 322 are not aligned with passive vent 312. Active vents 322 may have circular, rectangular or other shaped footprints. In some embodiments, a single fan element 310 or 320 which does not include a vent may be used in lieu of two fan elements.

FIG. 3A depicts system 300 in a neutral position. Thus, fan elements 310 and 320 are shown as substantially flat. In operation, fan elements 310 and 320 are actuated to vibrate between positions shown in FIGS. 3B and 3C. Fan elements 310 and 320 may, therefore, be piezoelectric actuators. Operation of system 300 is described in the context of FIGS. 3B and 3C. Referring to FIG. 3B, piezoelectric fan element 310 has been actuated to move away from (deform to be convex) structure 302, while piezoelectric fan element 320 has been actuated to move toward (deform to be concave) structure 302. This configuration is referred to as the suction arrangement. Because of the vibrational motion of piezoelectric fan elements 310 and 320, gap 342 has increased in size and is shown as gap 342A. For example, in some embodiments, gap 342 has a height of at least ten and not more than twenty micrometers in the neutral position (FIG. 3A). Gap 342A may have a height of at least twenty and not more than thirty micrometers in the suction arrangement (FIG. 3B). Thus, top chamber 340 has increased in volume, while bottom chamber 350 has decreased in volume. In the suction arrangement, the flow resistance of passive vent 312 (passive suction flow resistance) is low. Consequently, the pressure at passive vent 312 is low. In contrast, the flow resistance of active vent 322 (active suction flow resistance) is high. Consequently, the pressure at active vent 322 is high. Because of the low passive suction flow resistance, fluid is drawn into top chamber 340 through passive vent 312. This is shown by arrows in FIG. 3B. However, fluid does not flow out of (or flows out to a limited extent) active vent 322 because of the high passive suction flow resistance. However, active vent 322 is not physically closed in this configuration. For example, active vent 322 is not in contact with orifice plate 330 in the suction arrangement.

FIG. 3C depicts an expulsion arrangement. Piezoelectric fan element 310 has been actuated to move toward (deform to be concave) structure 302, while piezoelectric fan element 320 has been actuated to move away from (deform to be convex) structure 302. Because of the vibrational motion of piezoelectric fan elements 310 and 320, gap 342 has decreased in size and is shown as gap 342B. For example, in some embodiments, gap 342 has a height of at least ten and not more than twenty micrometers in the neutral position (FIG. 3A). Gap 342B has a height of at least five and not more than ten micrometers in the expulsion arrangement (FIG. 3C). Thus, top chamber 340 has decreased in volume, while bottom chamber 350 has increased in volume. In the expulsion arrangement, the flow resistance of passive vent 312 (passive expulsion flow resistance) is high. Consequently, the pressure at passive vent 312 is high. In contrast, the flow resistance of active vent 322 (active expulsion flow resistance) is low. Consequently, the pressure at active vent 322 is low. Because of the low active expulsion flow resistance, fluid is expelled from top chamber 340 through active vent 322, into bottom chamber 350 and through orifices 332. This is shown by arrows in FIG. 3C. However, fluid does not flow out of (or flows out to a limited extent) passive vent 312 because of the high passive expulsion flow resistance. Thus, passive vent 312 is considered closed and active vent 322 is considered open in the expulsion arrangement. However passive vent 312 is not physically closed in this configuration. For example, passive vent 312 is not in contact with fan element 320 in the expulsion arrangement. Gap 342B does not have a zero length.

Due to the vibrational motion of fan elements 310 and 320 (and the attendant decrease in gap 342A/442B from FIG. 3B to FIG. 3C), the fluid is drawn in to top chamber 340 and through orifices 332. The motion of the fluid is shown by arrows through orifices 332. The fluid may spread as it travels away from orifice plate 320, as shown by dashed lines and arrows for some orifices 332 in FIG. 3C. The fluid may deflect off of structure 302 (if present) and travels along the channel between structure 302 and orifice plate 330.

The motion between the positions shown in FIGS. 3B and 3C may be repeated. Thus, piezoelectric fan elements 310 and 320 vibrate, drawing fluid through passive vent 312 from the distal side of fan element 310, into top chamber 340, out of chamber 340 through active vent 322 and pushing the fluid through orifices 332 and toward structure 302. In some embodiments, the frequency/frequencies of vibration of fan elements 310 and/or 320 are analogous to those of fan element 120. Further, in some embodiments, fan element(s) 310 and/or 320 may be driven at or near the resonant frequency. The resonant frequencies of piezoelectric fan element(s) 310 and 320 may also be desired to be close. In some embodiments, the resonant frequencies of piezoelectric fan element(s) 310 and 320 are desired to be within one hundred Hertz. In some embodiments, feedback is used to maintain piezoelectric fan element(s) 310 and/or 320 at or near resonance. The resonant frequencies of fan elements 310 and/or 320 may be closely matched to the acoustic resonant frequencies of chamber(s) 340 and/or 350. In some embodiments, the speed at which the fluid impinges on structure 302 is in the ranges described herein for system(s) 100 and/or 200.

Using the system 300, fluid may be drawn in through passive vent 312 (in the suction arrangement) and driven through active vent 322 and orifices 332 (in the expulsion arrangement). Thus, airflow may be driven by system 300. Further, the fluid may efficiently dissipate heat from structure 302 in a manner analogous to the fluid driven by system 100. Thus, performance of a device utilizing system 300 may be improved. Further, system 300 may be a MEMS device. Thus, system 300 may small-having a total height analogous to that described above and may be used in similar devices.

Figure 4A:
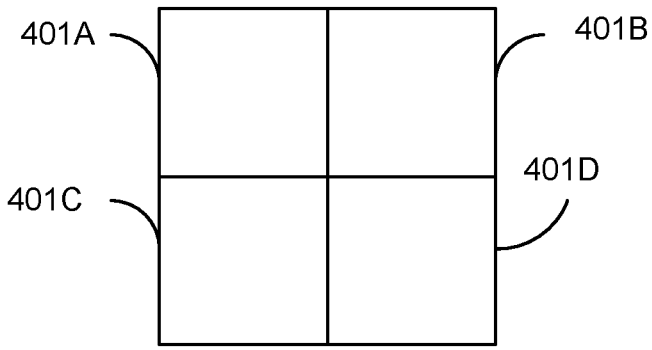
FIGS. 4A-4E depict an embodiment of an active system using fan elements formed in a tile.
Figure 4B:
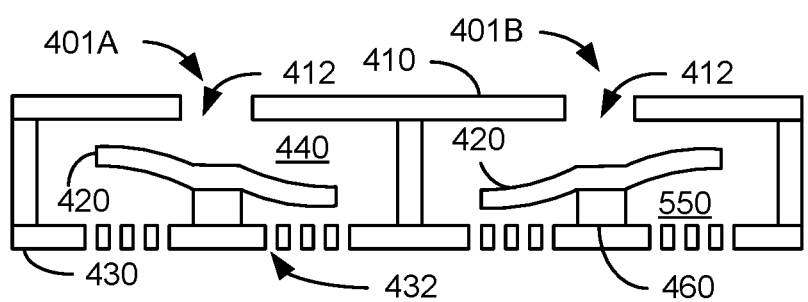
Figure 4C:
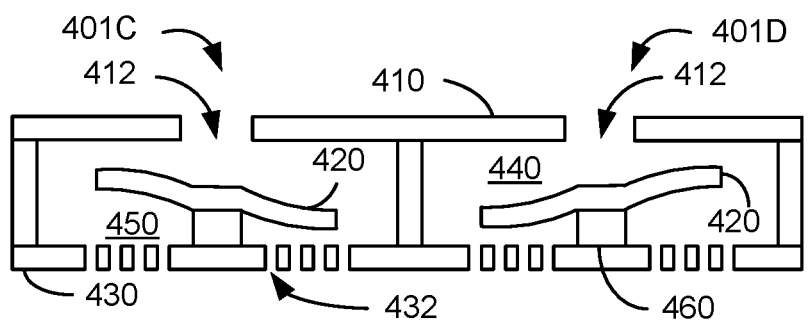
Figure 4D:
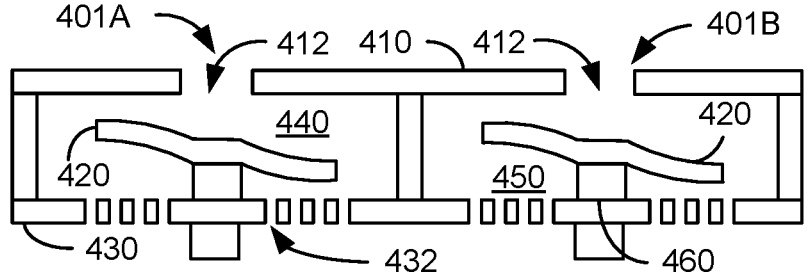
Figure 4E:
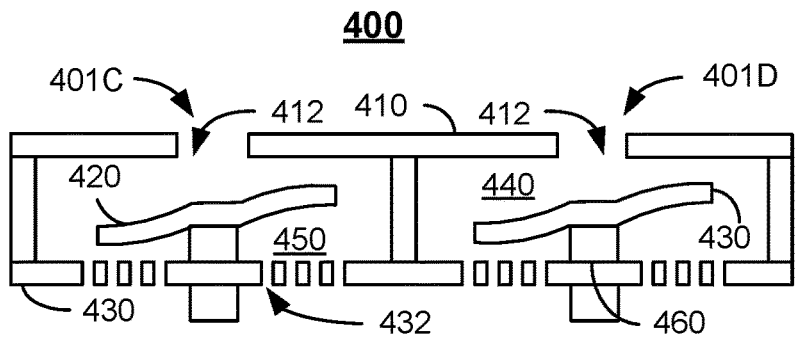

FIGS. 4A-4E depict an embodiment of active system 400 including multiple cells configured as a tile, or array. FIG. 4A depicts a top view, while FIGS. 4B-4E depict side views. FIGS. 4A-4E are not to scale. System 400 includes four cells 401A, 401B, 401C and 401D (collectively or generically 401), which are analogous to one or more of systems described herein. More specifically, cells 401 are analogous to system 100. In some embodiments, cell(s) 401 may be analogous to system 300 and/or another system. Although four cells 401 in a 2×2 configuration are shown, in some embodiments another number and/or another configuration of cells 401 might be employed. In the embodiment shown, cells 401 include shared top plate 410 having apertures 412, fan elements 420, shared orifice plate 430 including orifices 432, top chambers 440, bottom chambers 450 and anchors (support structures) 460 that are analogous to top plate 110 having apertures 112, fan element 120, orifice plate 130 having orifices 132, top chamber 140, bottom chamber 150 and anchor 160. In some embodiments, cells 401 may be fabricated together and separated, for example by cutting through top plate 410 and orifice plate 430. Fan elements 420 are driven out-of-phase (i.e. in a manner analogous to a seesaw). Further, as can be seen in FIGS. 4B-4C and FIGS. 4D-4E fan element 420 in one cell is driven out-of-phase with fan element(s) 420 in adjacent cell(s). In FIGS. 4B-4C, fan elements 420 in a row are driven out-of-phase. Thus, fan element 420 in cell 401A is out-of-phase with fan element 420 in cell 401B. Similarly, fan element 420 in cell 401C is out-of-phase with fan element 420 in cell 401D. In FIGS. 4D-4E, fan elements 420 in a column are driven out-of-phase. Thus, fan element 420 in cell 401A is out-of-phase with fan element 420 in cell 401C. Similarly, fan element 420 in cell 401B is out-of-phase with fan element 420 in cell 401D. By driving fan elements 420 out-of-phase, vibrations in system 400 may be reduced.

Cells 401 of system 400 function in an analogous manner to system(s) 100, 300, and/or an analogous system. Consequently, the benefits described herein may be shared by system 400. Because fan elements in nearby cells are driven out-of-phase, vibrations in system 400 may be reduced. Because multiple cells 401 are used, system 400 may enjoy enhanced cooling capabilities. Further, multiples of individual cells 401 and/or system 400 may be combined in various fashions to obtain the desired footprint of cells.

Figure 5:
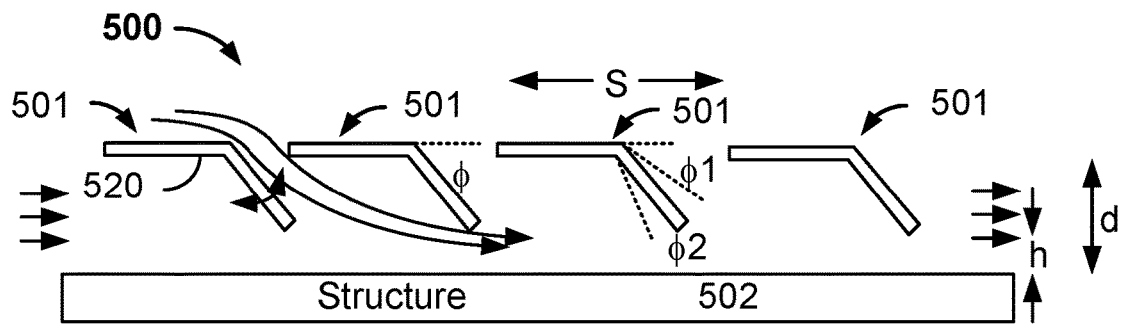
FIG. 5 is a diagram depicting an embodiment of an active system including fan elements usable in a device.

FIG. 5 is a diagram depicting an exemplary embodiment of a system 500 usable with a heat generating structure. For clarity, only certain components are shown and FIG. 5 is not to scale. Piezoelectric cooling system 500 is used in connection with a structure 502. Structure 502 is analogous to structure(s) 102, 202 and/or 302.

Piezoelectric cooling system 500 includes multiple cells 501 each of which includes a fan element 520. Cells 501 may have the same size range as described above such that S is at least three millimeters and not more than five millimeters. Piezoelectric blade elements 520 are oriented at angle ϕ when quiescent. When actuated, fan elements 520 vibrate between angles ϕ1 and ϕ2. In some embodiments, the angle of vibration (ϕ2-ϕ1) is at least five degrees and not more than twenty degrees. The lengths of the fan elements 520 may vary depending upon the distance to structure 502 and the angle of operation. For example, the vibrating portion of fan elements 520 may be at least one millimeter and not more than five millimeters in length. In some embodiments, the frequency of vibration is nominally 300 Hz. Other frequencies are possible. In some embodiments, ϕ is nominally thirty degrees and h is nominally two hundred fifty microns. The top of each fan element 520 is a distance, d, above the surface of structure 502. In some embodiments, d is at least three hundred microns and not more than five hundred micrometers. However, other spacings are possible In operation, fan elements 520 vibrate, drawing fluid from the distal side of one piezoelectric element to the proximal side of another piezoelectric element. This motion of the fluid can be seen by the curved arrows in FIG. 5. The fluid is driven along the surface of structure 502. In some embodiments, cells such as cells 100, 200, 300 and/or 401 (rotated ninety degrees) might be used. In addition, piezoelectric cooling structure 500 can be combined with one or more of piezoelectric cooling structures 100, 200, 300, and/or 400. In such an embodiment, fan elements 520 can aid in drawing air along the corresponding heat generating structure.

Systems 100, 200, 300, 400 and/or 500 may be used to drive fluid, such as air (or other gas) and/or a liquid. For example, systems 100, 200, 300, 400 and/or 500 may be used as a MEMs-based fan. Such a fan is in contrast to fans having rotating blades, which require significantly more space, lower back pressures, and provide a flow at a significantly lower speed. In some embodiments, the MEMs-based fan may provide flow not directly from fluid directly driven by fan elements 120, 220, 320, 420 and/or 520. More specifically, fan elements such as elements 120, 220, 420 and/or 520 may drive fluid through orifices at high velocity. In some embodiments, the speed at which the fluid leaves the orifices is at least thirty meters per second. In some embodiments, the fluid is driven by piezoelectric cooling elements at a speed of at least forty meters per second. In some such embodiments, the fluid has a speed of at least forty-five meters per second. In some embodiments, the fluid has a speed of at least fifty-five meters per second. Further, in some embodiments, fluid speeds of at least sixty meters per section and/or seventy-five meters per second may be achieved. Higher speeds may be possible in some embodiments. Because the fluid exits orifices at a high velocity, a low pressure is generated outside of orifice plate. This low pressure draws fluid through structures in the region of the orifice plate via entrainment. In some embodiments, a significantly higher volume of fluid flow is entrained than is expelled through the orifices. For example, at least five times through ten times the volume of fluid pushed through the orifices may be entrained. Thus, a macroscopic flow of fluid may be achieved. In some embodiments, any surfaces, such as for structures 102, 202, 302 and/or 502 are at least five through ten millimeters from the bottom of the orifice plate in order to obtain the desired high entrainment. Thus, MEMS based fans are described herein may more efficiently move fluid through entrainment.

Figure 6:
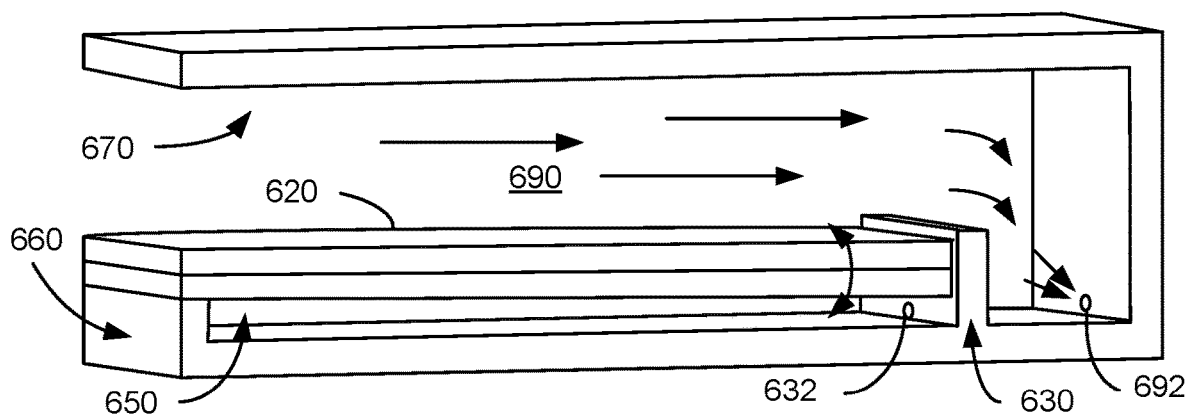
FIG. 6 is a diagram depicting an embodiment of a system usable as a fan.

For example, FIG. 6 is a diagram depicting an embodiment of system 600 that may operate as a fan. For clarity, only certain components are shown and FIG. 6 is not to scale. Portions of fan 600 are analogous to systems 100, 200, 300, and/or 500. Thus, fan 600 includes fan element 620, orifice plate 630 having orifices 632 therein, chamber 650, anchor 660, support structure 670, channel 690 and orifice 692 that are analogous to fan element 120, orifice plate 130 having orifices 132 therein, chamber 150, anchor 160, support structure 170 and channel 190. Although only a single orifice 632 is shown, multiple orifices may be present. Although a single fan element 620 is shown, multiple fan elements might be used. Although no vents are shown, fan element 620 may include vents/apertures.

Orifice plate 630 is located near an edge (or tip) of fan element 620 instead of below fan element 620. Thus, orifice plate 630 is substantially perpendicular to the surface of fan element 620 if fan element 620 is in a neutral position (e.g. undriven). In other embodiments, orifice plate 630 may be oriented at another angle.

In operation, fan element 620 undergoes vibrational motion. In some embodiments, fan element 620 is driven at or near resonance. In some embodiments, the frequency at which fan element 620 is driven may be in the ranges described herein (e.g. at least 15 kHz in some embodiments, and at least 20 kHz in some cases). Because fan element 620 is attached to anchor 660 at one side, fan element 620 may be considered to vibrate in a manner similar to a cantilevered beam, or half of fan element 120. Thus, the end of fan element 620 near orifice 632 vibrates. This may be seen by the dual headed arrow in FIG. 6.

As fan element 620 moves/bends, fluid may be driven through orifice 632 at high speed, for example in the ranges described above. Thus, fluid may be driven through orifice 632 at speeds of at least thirty meters per second, at least forty-five meters per second, or higher. Because the fluid exits the orifices 632 at a high velocity, a low pressure is generated on the side of orifice 632 opposite to fan element 620. This low pressure causes fluid to be drawn in, or entrained, through channel 690. This is shown by the unlabeled arrows in channel 690. Fluid exits through aperture 692. In some embodiments, the region near aperture 690 may be considered to be a jet channel because some fluid enters this region through orifice 632. In some embodiments, a significantly higher volume of fluid flows through channel 690 than through orifice 632. For example, at least five times through ten times the volume of fluid driven through orifice 632 may be entrained through channel 690, flow out of channel 690 and through aperture 692. Other relationships between fluid flows may occur in other embodiments. Thus, a macroscopic flow of fluid through channel 690 and aperture 692 may be achieved.

In some embodiments, the direction that this macroscopic fluid flows is substantially parallel to the surface of fan element 620 when in a neutral position. For example, fluid may flow out of aperture 692 in substantially the same direction (e.g. horizontal as shown in FIG. 6) as fluid flows through channel 690.

Using system 600, high volumes of fluid may be entrained. For example, in some embodiments, the flow rate of fluid entrained through channel 690 may be at least three to five multiplied by the flow rate of the fluid driven through orifice(s) 632. In some embodiments, higher flow rates may be achieved. Thus, high flow rates through channel 690 and aperture 692 may be achieved. Further, system 600 may be thin. For example, the height of system 600 in a direction perpendicular to the direction of fluid flow in channel 690 may be not larger than ten millimeters in some embodiments. In some embodiments, the height of system 600 may be not more than five millimeters. In some embodiments, system 600 may have a height of not more than three millimeters. As a result, system 600 may provide significant fluid flows with a low profile. Thus, system 600 may move large volumes of fluid in systems, such as mobile devices, with limited space. Thus, performance of such devices may be improved.

Figure 7A:
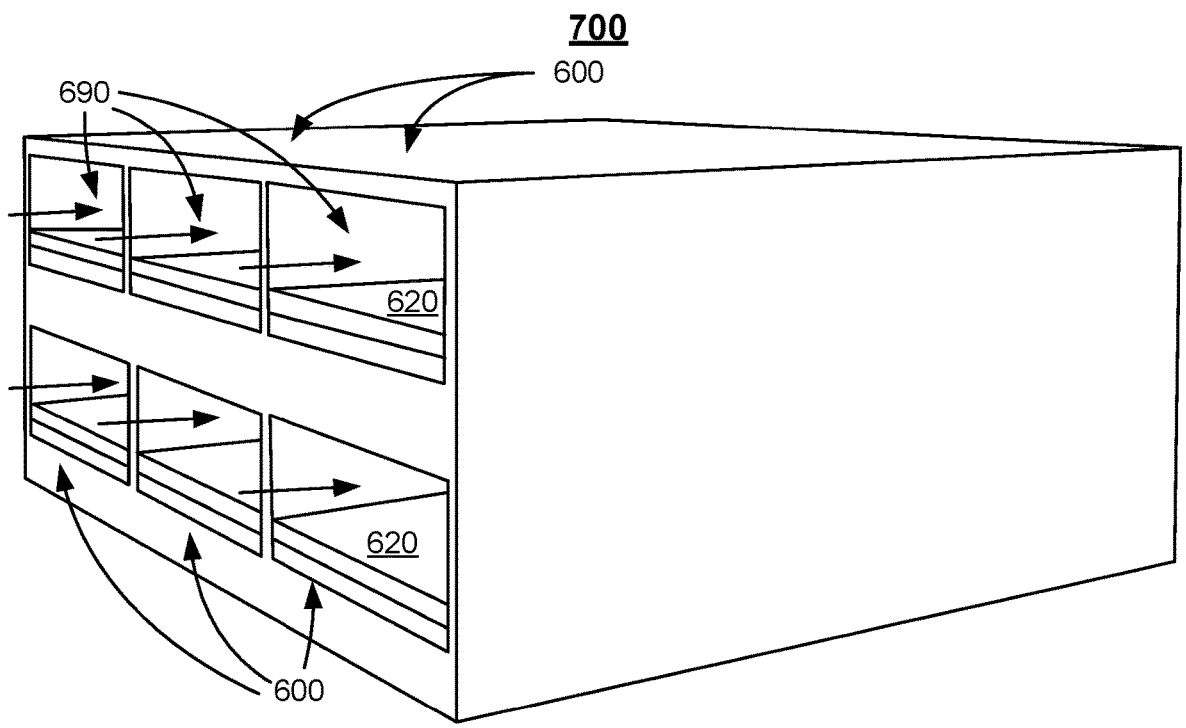
FIGS. 7A-7B are diagrams depicting an embodiment of a system usable as a fan including multiple cells.
Figure 7B:
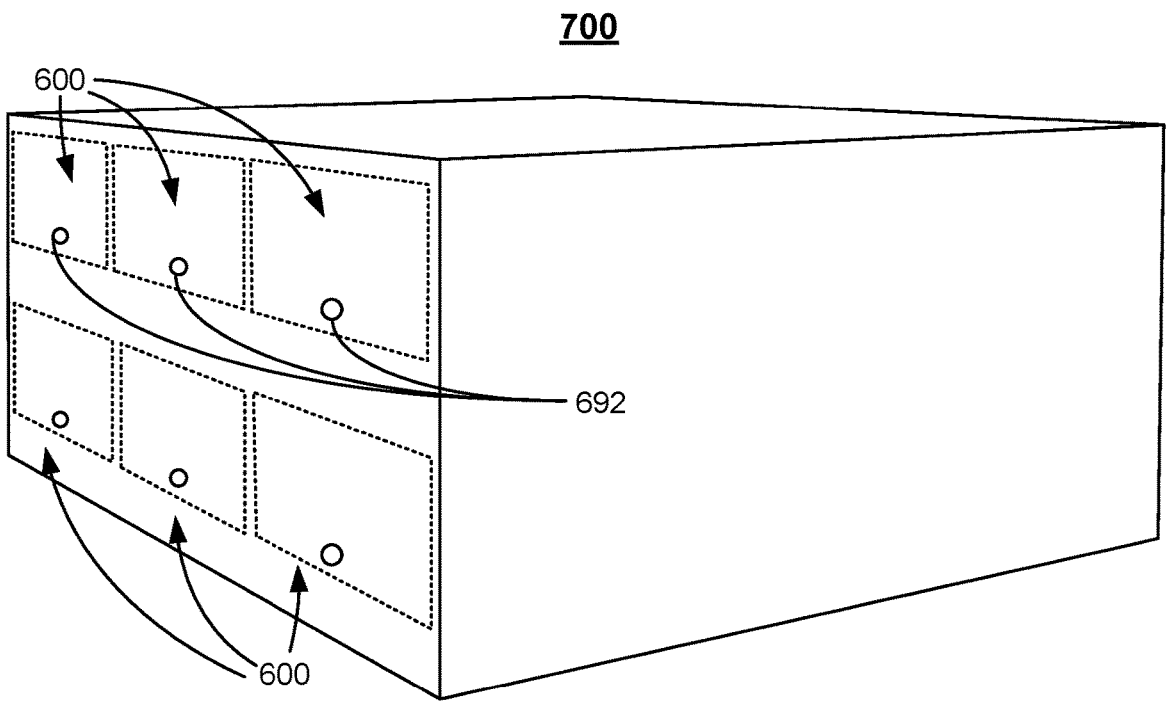

FIGS. 7A-7B are diagrams depicting an embodiment of a fan 700 having multiple cells 600. FIG. 7A is a perspective view indicating the inlet to a system 700, while FIG. 7B depicts the outlet from system 700. System 700 includes multiple cells 600, of which only some are labeled in FIG. 7A. Also indicated are fan elements 620, channels 690 and apertures 692. For simplicity, only some fan elements 620, channels 690 and apertures 692 are labeled. Although two layers of cells 600 are shown, in other embodiments, another number of layers (e.g. 1, 3, or more) and/or another number of cells 600 per layer may be used.

In operation, system 700 functions in a manner analogous to system 600. Thus, fluid is entrained through channels 690. The direction of fluid flow is shown by unlabeled arrows in FIG. 7A. Thus, by employing multiple cells 600 in one or more layers, the desired volume of fluid flowing substantially parallel to channel 690 (and the surface of fan elements 620) may be achieved. Thus, performance of a device employing system 700 may be improved.

Figure 8:
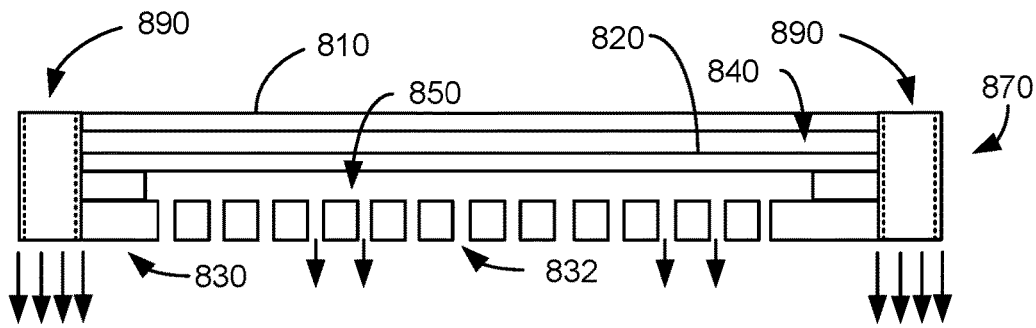
FIG. 8 is a diagram depicting an embodiment of a system usable as a fan.

FIG. 8 is a diagram depicting an embodiment of system 800 that may be used as a fan. For clarity, only certain components are shown and FIG. 8 is not to scale. System 800 is shown as including a single cell. However, multiple systems 800 may be arranged in a one-dimensional array (e.g. a line or line segment(s)) or two-dimensional array. Thus, system 800 may also be viewed as a single cell in a larger cooling system that may include multiple systems 800. System 800 may be used in mobile computing devices, non-mobile devices and/or with other devices.

System 800 includes a top fan element 810 and a bottom fan element 820. Fan elements 810 and 820 may be analogous to fan elements described herein, such as fan elements 120, 220, 310, 320, and/or 420. Fan 800 may have dimensions analogous to those described above. Thus, fan elements 810 and 820 may each includes a substrate, a piezoelectric layer and an electrode (not separately shown in FIG. 8). For simplicity, leads to the fan elements and other electronics are not shown. Orifice plate 830 having orifices 832 therein is analogous to orifice plate(s) 130, 230, 330, and/or 430 having orifices 132, 232, 332 and/or 432, respectively. Although a particular number, size and distribution of orifices 832 are shown, another number (including a single orifice), other size(s) and another distribution of orifice(s) may be used. In the embodiment shown, fan elements 810 and 820 do not include apertures and/or valves. Thus, the system 800 is analogous to system 300 depicted in FIG. 3. Chambers 840 and 850 analogous to chambers 340 and 350 are shown. However, fan elements 810 and 820 do not include vents therein. Thus, system 800 is also analogous to system 200 depicted in FIG. 2. In another embodiment, one or both of fan elements 810 and 820 may include an aperture(s), vent(s), and/or valve(s). Also shown are channels 890 in support structure 870 used to entrain fluid (e.g. air) in the direction shown by arrows in FIG. 8. Although a surface or jet channel for directing entrained air from channels 890 is not shown, such a surface or jet channel might be included. Other elements are not shown or are not labeled.

In the embodiment shown, top and bottom fan elements 810 and 820 vibrate. In some embodiments, top and bottom fan elements vibrate one hundred and eighty degrees out of phase. Thus, as top fan element 810 moves/bends away from orifice plate 830, bottom fan element 820 moves/bends closer to the orifice plate 830. As a result, bottom chamber 850 is reduced in size, forcing the flow of fluid through the orifices 832. This may be termed a compression stroke. In a suction stroke, bottom fan element 820 moves/bends away from orifice plate 830 and top fan element 810 bends toward orifice plate 830. Thus, fluid is sucked into the bottom chamber through orifices 832. Although there are no valves between the top and bottom chambers, the use of two fan elements 810 and 820 may improve performance of system 800 800. More specifically, two fan elements 810 and 820 vibrating out of phase may allow for sympathetic motion between fan elements 810 and 820. In some embodiments, the sympathetic motion of two fan elements 810 and 880 may increase the amplitude of vibration for fan elements 810 and 880. For example, the amplitude of vibration may be increased up to fifty percent in some embodiments.

In operation, during the compression stroke (bottom fan element 820 bends toward orifice plate 830), fluid is driven out of orifices 832 at a high velocity. Fluid flow out of the orifices is shown by arrows (for simplicity, fluid flow out of only some orifice 832 is indicated). In some embodiments, the speed at which the fluid leaves the orifices for the bottom chamber is at least thirty meters per second. In some embodiments, the fluid is driven by fan elements 810 and 820 at a speed of at least forty meters per second. In some such embodiments, the fluid has a speed of at least forty-five meters per second. In some embodiments, the fluid has a speed of at least fifty-five meters per second. Further, in some embodiments, fluid speeds of at least sixty meters per section and/or seventy-five meters per second may be achieved. However, higher speeds may be possible in some embodiments.

Because the fluid exits orifices 832 at a high velocity during a compression stroke, a low pressure is generated outside of orifice plate 830. Consequently, fluid is drawn in from the channels 890. In some embodiments, a significantly higher volume of fluid flow through the channels than from the bottom chamber is achieved. For example, at least five times through ten times the volume of fluid pushed through orifices 832 in a compression stroke may be entrained through the channels to flow out of channels 890. Thus, a macroscopic flow of fluid may be achieved. In some embodiments, any surfaces are at least five through ten millimeters from the bottom of the orifice plate in order to obtain the desired high entrainment. For system 800, there is a relatively high volume of fluid flow through channels 890. In some embodiments, the flow rate of fluid through channels 890 is at least three through five multiplied by the flow rate through orifices 832. In some embodiments, higher flow rates may be achieved. In some embodiments, a doubling of the area of the channels results in a volume per unit time flow of fluid that is at least six multiplied by the fluid flow rate with smaller channels (e.g. 2×channel area results in ≥6×fluid flow rate). Thus, system 800 may more efficiently move fluid through entrainment.

During a suction stroke (bottom fan element 820 moves away from orifice plate 830), fluid is drawn through orifices 832 into the bottom chamber 850. Although fluid is drawn back in through orifices 832, because of the high speed at which fluid leaves orifices 832 and the high volume of fluid coming through channels 890, new fluid is drawn into the bottom chamber from orifices 832. Thus, system 800 entrains large volumes of fluid such as air (and thus a relatively large flow) through channels 890 and draws in (and expels) a small volume of fluid through orifices 832.

System 800 may share the benefits of the systems described herein. System 800 may drive entrained fluid. The direction that entrained fluid is driven in the embodiment shown may be substantially perpendicular to the surface of fan elements 810 and 820. Because two fan elements 810 and 820 are used and driven out of phase, sympathetic motion may be achieved. Consequently, the amplitude of vibration of fan elements 810 and 820 may be increased and fluid flow enhanced. Thus, performance of a device employing system 800 may be improved.

Figure 9:
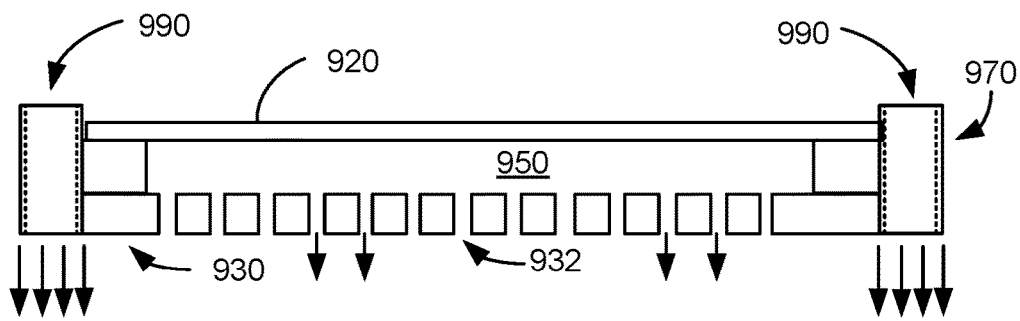
FIG. 9 is a diagram depicting an embodiment of a system usable as a fan.

FIG. 9 is a diagram depicting an embodiment of system 900 that may be used as a fan. For clarity, only certain components are shown and FIG. 9 is not to scale. System 900 is shown as including a single cell. However, multiple systems 800 may be arranged in a one-dimensional array (e.g. a line or line segment(s)) or two-dimensional array. Thus, system 900 may also be viewed as a single cell in a larger cooling system that may include multiple systems 900. System 900 may be used in mobile computing devices, non-mobile devices and/or with other devices.

System 900 includes bottom fan element 820. Fan element 920 may be analogous to fan elements described herein, such as fan elements 120, 220, 310, 320, 420, and/or 920. Fan 900 may have dimensions analogous to those described above. Thus, fan element 920 may each includes a substrate, a piezoelectric layer and an electrode (not separately shown in FIG. 8). For simplicity, leads to the fan elements and other electronics are not shown. Orifice plate 930 having orifices 932 therein is analogous to orifice plate(s) 130, 230, 330, 430 and/or 930 having orifices 132, 232, 332, 432 and/or 832, respectively. Although a particular number, size and distribution of orifices 932 are shown, another number (including a single orifice), other size(s) and another distribution of orifice(s) may be used. In the embodiment shown, fan elements 810 and 820 do not include apertures and/or valves. Thus, the system 900 is analogous to system 200 depicted in FIG. 2. Also shown are channels 990 in support structure 970 used to entrain fluid (e.g. air) in the direction shown by arrows in FIG. 9. Although a surface or jet channel for directing entrained air from channels 990 is not shown, such a surface or jet channel might be included. Other elements are not shown or are not labeled.

System 900 operates in an analogous manner to system 800. Thus, fan element 920 vibrates, causing fluid to be driven from chamber 950 through orifices 932. Fluid driven through orifices 932 may travel at the speeds described herein (e.g. at least thirty meters per second or above). Thus, a low pressure region is formed outside of orifice plate 930 (e.g. opposite to chamber 950). The low pressure region entrains large volumes of fluid through channels 990, in a manner analogous to that described above. Thus, flow rates analogous to those described above (e.g. at least three through five multiplied by the flow rate through orifices 932, or higher) may be achieved.

Thus, system 900 shares some of the benefits of system 800. However, only one fan element 920 is used. System 900 may still entrain fluid (e.g. air) through channels 990 as shown by arrows. Thus, system 900 may be used to move fluid at the desired flow rates. Performance of a device employing system 900 may thus be improved.

Figure 10:
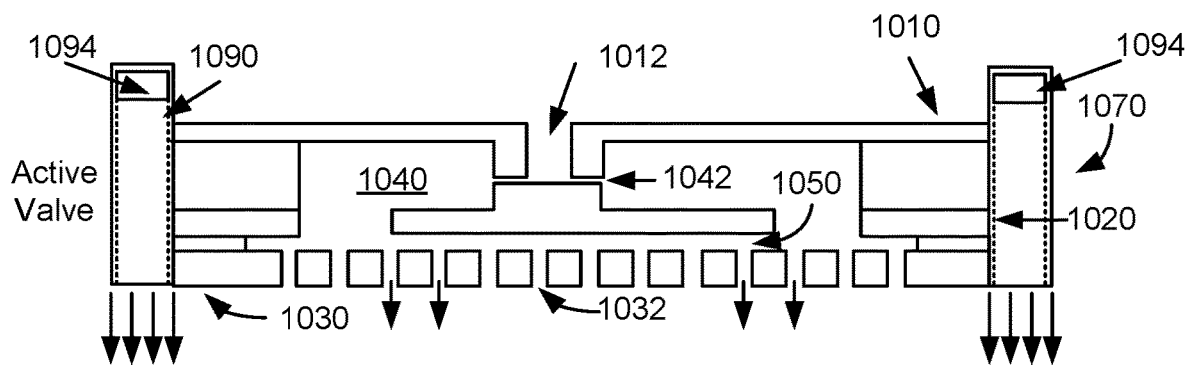
FIG. 10 is a diagram depicting an embodiment of a system usable as a fan.

FIG. 10 is a diagram depicting an embodiment of system 1000 usable as a fan. For clarity, only certain components are shown and FIG. 10 is not to scale. System 1000 is shown as including a single cell. However, multiple systems 1000 may be arranged in one or two dimensions. Because system 1000 is analogous to systems 100, 200, 300, 500, 800 and 900, analogous components have similar labels. In the embodiment shown, there are two fan elements (top fan element 1010 and bottom fan element 1020), orifice plate 1030 with orifices 1032 therein, top chamber 1040, bottom chamber 1050, support structure 1070, and vent 1012 that are analogous to top fan element 310 and bottom fan element 320, orifice plate 330 with orifices 332 therein, top chamber 340, bottom chamber 350, support structure 370, and vent 312, respectively. Thus, system 1000 is analogous to system 300. Also shown is optional ducting 1094, which may be used to direct fluid to channels 1090.

In the embodiment shown, fan elements 1010 and 1020 vibrate. In some embodiments, fan elements 1010 and 1020 vibrate one hundred and eighty degrees out of phase. Thus, as top fan element 1010 moves/bends away from orifice plate 1032, bottom fan element moves/bends closer to orifice plate 1030. As a result, bottom chamber 1050 is reduced in size, preventing or reducing the flow of fluid through orifices 1032. In addition, gap 1042 widens and a fluid (e.g. air) is drawn into top chamber 1040. This may be termed a suction stroke. In a compression stroke, bottom fan element 1020 moves/bends away from orifice plate 1030 and top fan element 1010 bends toward orifice plate 1030. Thus, system 1000 operates in a manner analogous to system 300.

Fluid is driven out of orifices 1032 at a high velocity. Fluid flow out of the orifices is shown by arrows. In some embodiments, the speed at which the fluid leaves the orifices for the bottom chamber is at least thirty meters per second. In some embodiments, the fluid is driven by fan elements 1010 and 1020 through orifices 1032 is at a speed of at least forty meters per second. In some such embodiments, the fluid has a speed of at least forty-five meters per second. In some embodiments, the fluid has a speed of at least fifty-five meters per second. Further, in some embodiments, fluid speeds of at least sixty meters per section and/or seventy-five meters per second may be achieved. However, higher speeds may be possible in some embodiments. Fluid speeds in the range of thirty meters per second or more may be achievable in part due to judicious selection of the diameters of the orifices in the orifice plate.

System 1000 operates in a manner analogous to the systems described above. Because the fluid exits the orifices at a high velocity, a low pressure is generated outside of orifice plate 1030. Consequently, fluid is drawn in through channels 1090. In some embodiments, a significantly higher volume of fluid flow from channels 1090 than from the chambers 1040 and 1050 is achieved. For example, at least three through five multiplied by the flow rate of fluid pushed through orifices 1032 is entrained through channels 1090. In some embodiments, high flow rates may be possible. Thus, a macroscopic flow of fluid may be achieved. In some embodiments, surfaces are at least five through ten millimeters from the bottom of the orifice plate in order to obtain the desired high entrainment. Thus, there is a relatively high volume of fluid flow through channels 1090. In some embodiments, a doubling of the area of channels 1090 results in a volume per unit time flow of fluid that is at least six multiplied by the fluid flow rate with smaller channels (e.g. 2×channel area results in ≥6×fluid flow rate). Thus, system 1000 may more efficiently move fluid.

Thus, system 1000 shares some of the benefits of system(s) 800 and/or 900. Thus, system 1000 may be used to move fluid at the desired flow rates. Performance of a device employing system 1000 may thus be improved.

Figure 11:
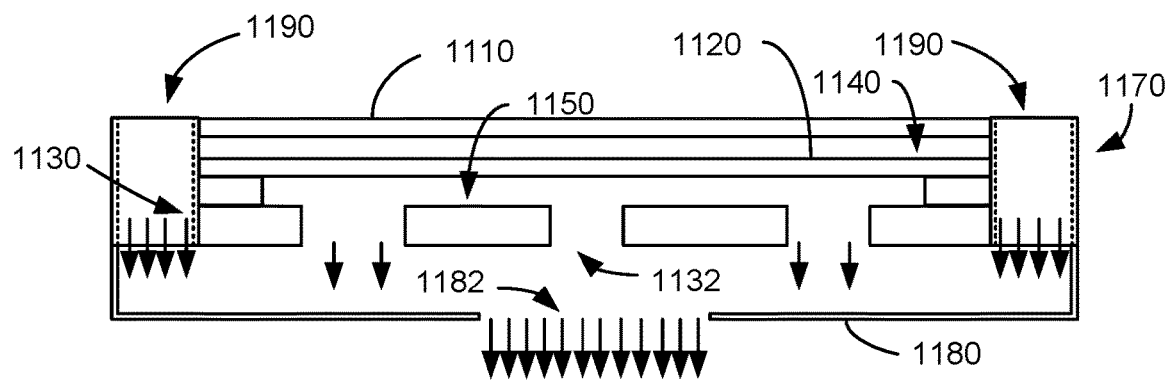
FIG. 11 is a diagram depicting an embodiment of a system usable as a fan.

FIG. 11 is a diagram depicting an embodiment of a system 1100. For clarity, only certain components are shown and FIG. 11 is not to scale. The system 1100 is shown as including a single cell. However, multiple systems 1100 may be arranged in one or two dimensions. Because system 1100 is analogous to systems 100, 200, 300, 500, 800, 900 and 1000, analogous components have similar labels. In the embodiment shown, there are two fan elements (top fan element 1110 and bottom fan element 1120), orifice plate 1130 with orifices 1132 therein, top chamber 1140, bottom chamber 1150, support structure 1170, and channels 1190 that are analogous to top fan element 810 and bottom fan element 820, orifice plate 830 with orifices 832 therein, top chamber 840, bottom chamber 850, support structure 870, and channels 890. Thus, system 1100 is analogous to system 800. Although no vents are shown, one or both of fan elements 1110 and/or 1120 may include vents/apertures.

System 1100 operates in a manner analogous to the systems described above. In the embodiment shown, fan element(s) 1110 and/or 1120 vibrate. In some embodiments, top and bottom fan elements vibrate one hundred and eighty degrees out of phase. Thus, as top fan element 1110 moves/bends away from the orifice plate, the bottom fan element moves/bends 1120 closer to orifice plate 1130. Fluid is driven out of the orifices 1132 at a high velocity. Fluid flow out of the orifices 1122 is shown by arrows. In some embodiments, the speed at which the fluid leaves the orifices for the bottom chamber is at least thirty meters per second. The fluid speeds achieved may be analogous to those described above. Because the fluid exits orifices 1132 at a high velocity, a low pressure is generated outside of the orifice plate 1130. Consequently, fluid is drawn in through channels 1190 and through jet channel 1180. Jet channel 1180 may be utilized to direct the entrained flow out through aperture(s), such as aperture 1182 in jet channel 1180. In the embodiment shown, a single, centrally located aperture 1182 is used. However, another number and/or other location(s) of apertures may be selected. Jet channel 1180 may be used to direct the entrained fluid. Fluid exiting jet channel 1130 is shown by arrows. In some embodiments, the surface forming jet channel 1130 is at least five through ten millimeters from the bottom of the orifice plate 1130 in order to obtain the desired high entrainment. In some embodiments, a significantly higher volume of fluid flow from the channels 1190 and through jet channel 1180 than from chamber 1150 is achieved. For example, flow rates on the order of those described above may be obtained. Thus, a macroscopic flow of fluid may be achieved. Thus, MEMS based fan 1100 may more efficiently move fluid.

Thus, system 1100 shares some of the benefits of system(s) 800, 900 and/or 1000. Thus, system 1100 may be used to move fluid at the desired flow rates. Performance of a device employing system 1100 may thus be improved.

Figure 12:
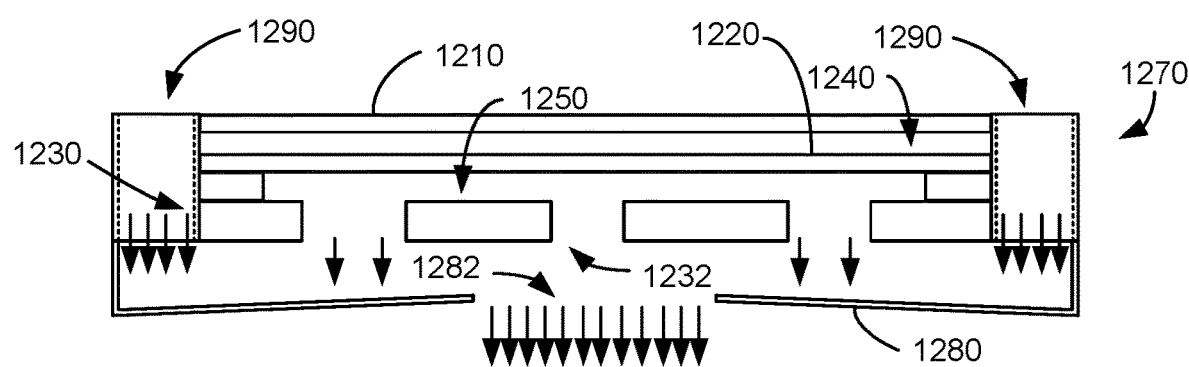
FIG. 12 is a diagram depicting an embodiment of a system usable as a fan.

FIG. 12 is a diagram depicting an embodiment of a system 1200. For clarity, only certain components are shown and FIG. 12 is not to scale. The system 1200 is shown as including a single cell. However, multiple systems 1200 may be arranged in one or two dimensions. Because system 1200 is analogous to systems 100, 200, 300, 500, 800, 900, 1000 and 1100, analogous components have similar labels. In the embodiment shown, there are two fan elements (top fan element 1210 and bottom fan element 1220), orifice plate 1230 with orifices 1232 therein, top chamber 1240, bottom chamber 1250, support structure 1270, channels 1290 and jet channel 1280 having aperture 1282 that are analogous to top fan element 1110 and bottom fan element 1120, orifice plate 1130 with orifices 1132 therein, top chamber 1140, bottom chamber 1150, support structure 1170, channels 1190 and jet channel 1180. Thus, system 1200 is analogous to system 1100. Although no vents are shown, one or both of fan elements 1210 and/or 1220 may include vents/apertures.

System 1200 is analogous to system 1100. Thus, jet channel 1280 is analogous to jet channel 1180 and may be used to direct the entrained fluid. Fluid exiting jet channel 1280 is shown by arrows. However, in the embodiment shown, jet channel 1280 is tapered.

System 1200 operates in a manner analogous to the systems described above. Consequently, entrained fluid is drawn in from the channels 1290 and through jet channel 1280. The angle of the taper of jet channel 1280 may be adjusted to control the flow from orifices 1232 and/or provide the desired entrained flow through jet channel 1280. Thus, a macroscopic flow of fluid (e.g. on the order of the flow rates described above) may be achieved and controlled. Thus, system 1200 may more efficiently provide the desired fluid flow.

Thus, system 1200 shares some of the benefits of system(s) 800, 900, 1000, and/or 1100. Thus, system 1200 may be used to move fluid at the desired flow rates. Performance of a device employing system 1200 may thus be improved.

Figure 13:
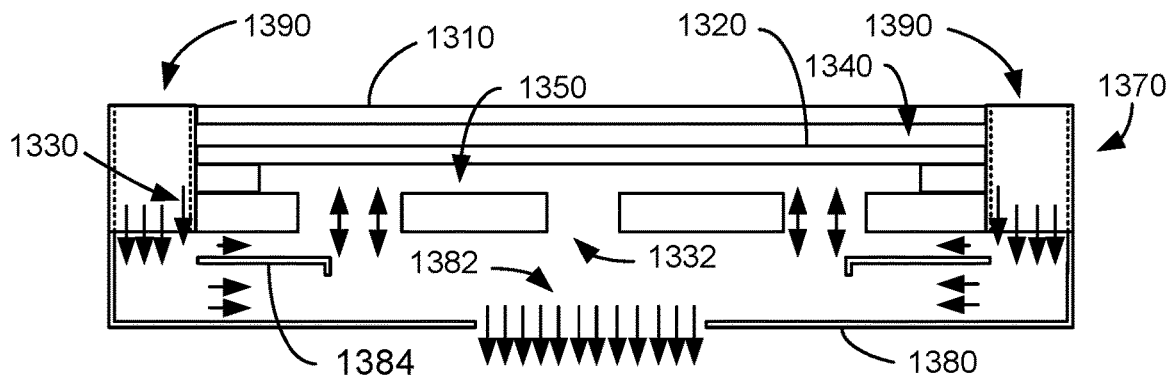
FIG. 13 is a diagram depicting an embodiment of a system usable as a fan.

FIG. 13 is a diagram depicting an embodiment of a system 1300. For clarity, only certain components are shown and FIG. 13 is not to scale. The system 1300 is shown as including a single cell. However, multiple systems 1300 may be arranged in one or two dimensions. Because system 1300 is analogous to systems 100, 200, 300, 500, 800, 900, 1000, 1100 and 1200, analogous components have similar labels. In the embodiment shown, there are two fan elements (top fan element 1310 and bottom fan element 1320), orifice plate 1330 with orifices 1332 therein, top chamber 1340, bottom chamber 1350, support structure 1370, channels 1390 and jet channel 1380 having aperture 1382 that are analogous to top fan element 1110 and bottom fan element 1120, orifice plate 1130 with orifices 1132 therein, top chamber 1140, bottom chamber 1150, support structure 1170, channels 1190 and jet channel 1180 having aperture 1182. Thus, system 1300 is analogous to system 1100. Although no vents are shown, one or both of fan elements 1310 and/or 1320 may include vents/apertures.

Also shown is separator 1384 that may be used to divide flow in jet channels 1380 into two flows. The first flow is between separator 1384 and orifice plate 1330. This flow may enter bottom chamber 1350 and be pushed out of orifices 1332 to generate the entrained flow. The second flow is the entrained flow that travels through the bottom portion of jet channel 1380, between separator 1384 and the walls of jet channel 1380. This flow which may exit system 1300 as shown by arrows.

The system 1300 operates in a manner analogous to the systems described above. Thus, as fan element(s) 1310 and/or 1320 are driven to vibrate (optionally out-of-phase). Fluid is driven out of the orifices 1332 at a high velocity. In some embodiments, the speeds at which the fluid leaves the orifices may be analogous to those described above. Because the fluid exits the orifices 1332 at a high velocity, a low pressure is generated outside of the orifice plate 1330. Consequently, fluid is drawn in from the channels 1390 and through divided jet channel 1380. In some embodiments, a significantly higher volume of fluid flow from the channels 1390 than from chamber 1350 is achieved. For example, flow rates on the order of those described above may be obtained. Thus, a macroscopic flow of fluid may be achieved. As discussed above, the fluid in jet channel 1380 is split by separator 1384. A portion of the fluid between separator 1384 and fan element 1320 is used to drive entrainment, while the remainder flows out of jet channel 1380 as shown by the arrows. Thus, MEMS based fan 1300 may more efficiently move fluid.

Thus, system 1300 shares some of the benefits of system(s) 800, 900, 1000, 1100, and/or 1200. Thus, system 1300 may be used to move fluid at the desired flow rates. Performance of a device employing system 1300 may thus be improved.

Figure 14:
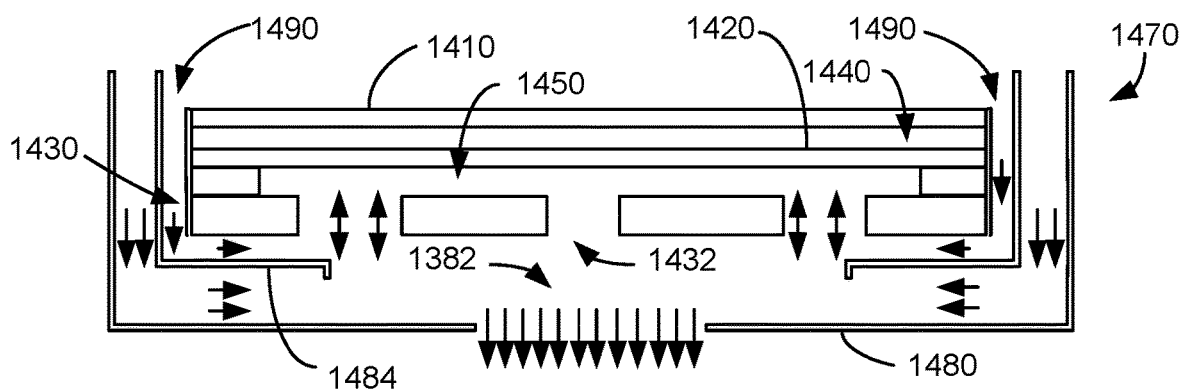
FIG. 14 is a diagram depicting an embodiment of a system usable as a fan.

FIG. 14 is a diagram depicting an embodiment of a system 1400. For clarity, only certain components are shown and FIG. 14 is not to scale. The system 1400 is shown as including a single cell. However, multiple systems 1400 may be arranged in one or two dimensions. Because system 1400 is analogous to systems 100, 200, 300, 500, 800, 900, 1000, 1100, 1200 and 1300, analogous components have similar labels. In the embodiment shown, system 1400 includes top fan element 1410, bottom fan element 1420, orifice plate 1430 having orifices 1432 therein, top chamber 1440, bottom chamber 1450, support structure 1470, channels 1490 and jet channel 1480 having aperture 1482 that are analogous to top fan element 1110 and bottom fan element 1120, orifice plate 1130 with orifices 1132 therein, top chamber 1140, bottom chamber 1150, support structure 1170, channels 1190 and jet channel 1180 having aperture 1182. Thus, system 1400 is analogous to system 1100. Although no vents are shown, one or both of fan elements 1410 and/or 1420 may include vents/apertures.

Thus, system 1400 operates in a manner analogous to the systems described above, particularly system 1300. Jet channel 1480 and channel 1490 are further divided than in system 1300. Entrained fluid in channel 1490 may be drawn into chamber 1450 and driven out of orifices 1432 by actuator(s) 1410 and 1420. Fluid is driven out of the orifices 1432 at a high velocity. The fluid speeds achieved may be analogous to those described above. Thus, fluid is entrained in channel 1490 and jet channel 14800. The remaining entrained flow is through jet channel 1480. Jet channel 1480 may be used to direct the entrained fluid and may be positioned in a manner analogous to that described herein. Fluid exiting jet channel 1480 is shown by arrows. Thus, a macroscopic flow of fluid (e.g. on the order of the flow rates described above) may be achieved. Thus, system 1400 may more efficiently move fluid.

Thus, system 1400 shares some of the benefits of system(s) 800, 900, 1000, 1100, 1200 and/or 1300. Thus, system 1400 may be used to move fluid at the desired flow rates. Performance of a device employing system 1400 may thus be improved.

Figure 15:
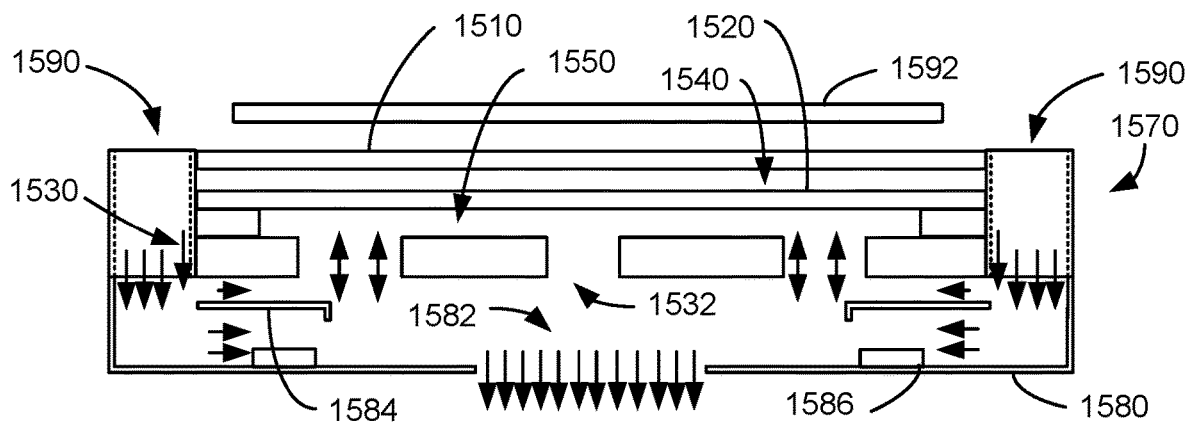
FIG. 15 is a diagram depicting an embodiment of a system usable as a fan.

FIG. 15 is a diagram depicting an embodiment of a system 1500. For clarity, only certain components are shown and FIG. 15 is not to scale. The system 1500 is shown as including a single cell. However, multiple systems 1500 may be arranged in one or two dimensions. Because system 1500 is analogous to systems 100, 200, 300, 500, 800, 900, 1000, 1100, 1200, 1300 and 1400, analogous components have similar labels. In the embodiment shown, system 1500 includes top fan element 1510, bottom fan element 1520, orifice plate 1530 having orifices 1532 therein, top chamber 1540, bottom chamber 1550, support structure 1570, channels 1590 and jet channel 1580 having aperture 1582 that are analogous to top fan element 1110 and bottom fan element 1120, orifice plate 1130 with orifices 1132 therein, top chamber 1140, bottom chamber 1150, support structure 1170, channels 1190 and jet channel 1180 having aperture 1182. Thus, system 1500 is analogous to system 1100. Although no vents are shown, one or both of fan elements 1510 and/or 1520 may include vents/apertures.

System 1500 is analogous to system 1400 and operates in a similar manner. Thus, system 1500 includes separator 15840. In addition, jet channel 1580 includes plugs 1586, only one of which is labeled. Plugs 1586 may be used to moderate flow through jet channel 1580. Also shown is hood 1594 that may be used to control the direction of fluid flow to channels 1590. For example, fluid may be directed across the top of fan element 1510. Thus, a macroscopic flow of fluid (e.g. on the order of the flow rates described above) may be achieved. Thus, system 1500 may more efficiently move fluid in the desired direction.

Thus, system 1500 shares some of the benefits of system(s) 800, 900, 1000, 1100, 1200, 1300 and/or 1400. Thus, system 1500 may be used to move fluid at the desired flow rates. Performance of a device employing system 1500 may thus be improved.

Figure 16:
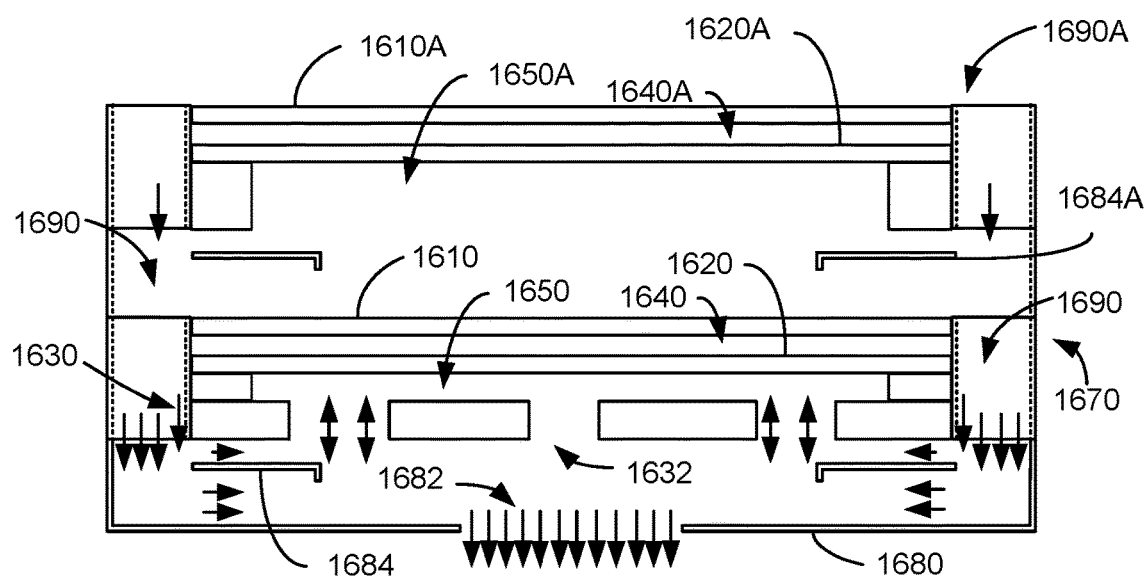
FIG. 16 is a diagram depicting an embodiment of a system usable as a fan.

FIG. 16 is a diagram depicting an embodiment of a system 1600. For clarity, only certain components are shown and FIG. 16 is not to scale. The system 1600 is shown as including a single cell. However, multiple systems 1600 may be arranged in one or two dimensions. Because system 1600 is analogous to systems 100, 200, 300, 500, 800, 900, 1000, 1100, 1200, 1300, 1400 and 1600, analogous components have similar labels. In the embodiment shown, system 1600 includes top fan element 1610, bottom fan element 1620, orifice plate 1630 having orifices 1632 therein, top chamber 1640, bottom chamber 1650, support structure 1670, channels 1690 and jet channel 1680 having aperture 1682 and separator 1684 that are analogous to top fan element 1310 and bottom fan element 1320, orifice plate 1330 with orifices 1332 therein, top chamber 1340, bottom chamber 1350, support structure 1370, channels 1390 and jet channel 1380 having aperture 1382 and aperture 1384. Thus, system 1600 is analogous to system 1300. Although no vents are shown, one or both of fan elements 1510 and/or 1520 may include vents/apertures. System 1600 also includes cascaded cells. Thus, system 1600 includes fan elements 1610A and 1620A, channels 1690A, top chamber 1640A, bottom chamber 1650A, and separator 1684A that are analogous to fan elements 1610 and 1620, channels 1690, top chamber 1640, bottom chamber 1650, and separator 1684.

Fan elements 1610A, 1610B, 1680A and/or 1680B vibrate. In some embodiments, pairs of fan elements (1610A and 1620A, 1610 and 1620) vibrate one hundred and eighty degrees out of phase. Thus, as top actuator 1610/1610A moves/bends away from orifice plate 1630, bottom actuator 1620/1620A moves/bends closer to orifice plate 1630. Consequently, fluid is entrained in channels 1690 and 1690A. Jet channel 1680 may be used to direct the entrained fluid. Fluid exiting jet channel 1680 through aperture 1682 is shown by arrows.

System 1600 is a cascaded architecture. Each level in the cascade includes a system analogous to system 1300. However, other configurations may be used. In the embodiment shown, the fan elements are aligned in the cascade. In some embodiments, the fan elements in a cascade may be offset. The system 1600 operates in a manner analogous to the systems described above. However, the use of cascaded actuators may allow the entrained fluid flow and/or pressure to be tailored. Thus, a macroscopic flow of fluid (e.g. on the order of the flow rates described above) may be achieved. Thus, system fan 1600 may more efficiently move fluid.

Thus, system 1600 shares some of the benefits of system(s) 800, 900, 1000, 1100, 1200, 1300, 1400 and/or 1500. Thus, system 1600 may be used to move fluid at the desired flow rates. Performance of a device employing system 1600 may thus be improved.

Figure 17:
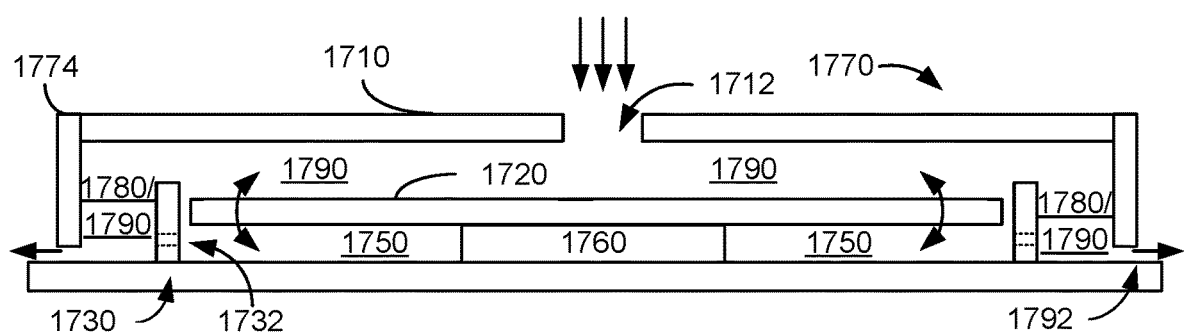
FIG. 17 is a diagram depicting an embodiment of a system usable as a fan.

FIG. 17 is a diagram depicting an embodiment of system 1700 that may be used as a fan. For clarity, only certain components are shown and FIG. 17 is not to scale. System 1700 is shown as including a single cell. However, multiple systems 1700 may be arranged in a one-dimensional array (e.g. a line or line segment(s)) or two dimensional array. Thus, system 1700 may also be viewed as a single cell in a larger cooling system that may include multiple systems 1700. System 1700 may be used in mobile computing devices, non-mobile devices and/or with other devices.

System 1700 includes bottom fan element 1720. Fan element 1720 may be analogous to fan elements described herein, such as fan elements 120, 220, 310, 320, 420, 820, 920, 1020, 1120, 1220, 1320, 1420, 1520 and 1620. Fan 1700 may have dimensions analogous to those described above. Thus, fan element 1720 may include a substrate, a piezoelectric layer and an electrode (not separately shown in FIG. 17). For simplicity, leads to the fan elements and other electronics are not shown. Orifice plate 1730 having orifices 932 therein is analogous to orifice plate(s) 130, 230, 330, 430, 630, 830, 930, 1030, 1130, 1230, 1330, 1430, 1530 and/or 1630 having orifices 132, 232, 332, 432, 632, 832, 932, 1032, 1132, 1232, 1332, 1432, 1532 and/or 1632, respectively. Although a particular number, size and distribution of orifices 1732 are shown, another number (including a single orifice or multiple orifices), other size(s) and another distribution of orifice(s) may be used. System 1700 is analogous to system 100 depicted in FIG. 1 as well as to system 600 depicted in FIG. 6. Orifice plates 1730 are located near the tip of fan element 1720. Also shown are channels 1790 in support structure 1770, as well as apertures 1792 in sidewalls 1774 used to entrain fluid (e.g. air) in the direction shown by arrows in FIG. 17.

System 1700 operates in an analogous manner to systems 100 and 600. Thus, fan element 1720 vibrates as shown by the unlabeled, dual-headed arrows in FIG. 17. This vibrational motion causes fluid to be driven from chamber 1750 through orifices 1732 and into jet channel 1780. Fluid driven through orifices 1732 may travel at the speeds described herein (e.g. at least thirty meters per second or above). Thus, a low pressure region is formed outside of orifice plate 1730 (e.g. opposite to chamber 1750) in jet channel 1780. The low pressure region entrains large volumes of fluid through channels 1790, in a manner analogous to that described above. Thus, flow rates analogous to those described above (e.g. at least three through five multiplied by the flow rate through orifices 1732, or higher) may be achieved through channels 1790 This fluid also travels through jet channel 1780 and exits via apertures 1792.

Thus, system 1700 shares some of the benefits of system(s) 800, 900, 1000, 1100, 1200, 1300, 1400, 1500 and/or 1600. Thus, system 1700 may be used to move fluid at the desired flow rates. Performance of a device employing system 1700 may thus be improved.

Figure 18:
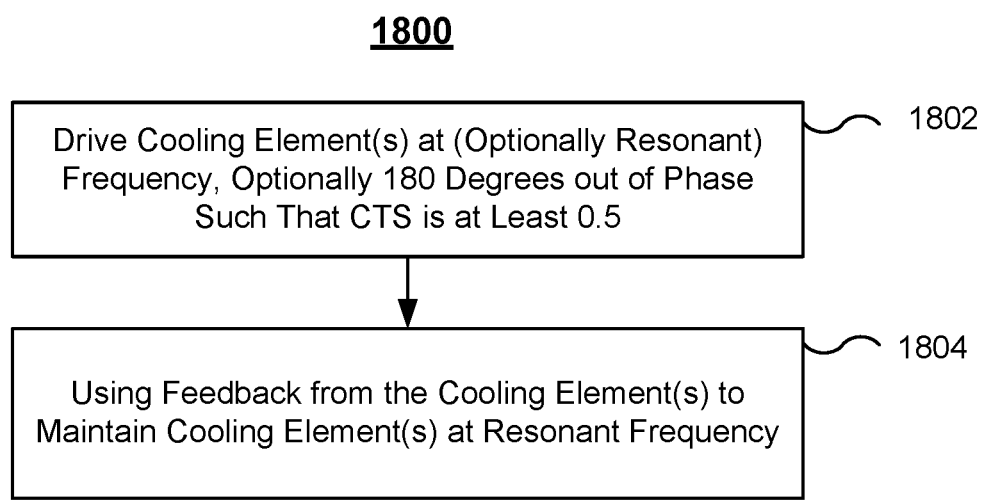
FIG. 18 is a flow-chart depicting an embodiment of a method for driving fluid flow.

FIG. 18 is a flow chart depicting an embodiment of method 1800 for driving an active fan element in a mobile device. Method 1800 may include steps that are not depicted for simplicity. Method 1800 is described in the context of system 700. However, method 1800 may be used with other systems including but not limited to systems and cells described herein.

One or more of the fan element(s) in a system is actuated to vibrate, at 1802. At 1802, an electrical signal having the desired frequency is used to drive the fan element(s). In some embodiments, the fan elements are driven at or near structural and/or acoustic resonant frequencies at 1802. The driving frequency may be 15 kHz or higher (e.g. at least 20 kHz), for example for system 700. If multiple fan elements are driven at 1802, the fan elements may be driven out-of-phase. In some embodiments, the fan elements are driven substantially at one hundred and eighty degrees out-of-phase. For example, a fan element may vibrate in the opposite direction as an adjacent fan element. In some embodiments, individual fan elements are driven out-of-phase. For example, different portions of a fan element may be driven to vibrate in opposite directions. Also at 1802, the fan elements are driven such that the fluid exiting orifices has a high velocity, for example in the ranges described herein. Thus, a low pressure may be developed at the orifice plate and fluid drawn through the channels.

Feedback from the piezoelectric fan element(s) is used to adjust the driving current, at 1804. In some embodiments, the adjustment is used to maintain the frequency at or near the acoustic and/or structural resonant frequency/frequencies of the fan element(s) and/or system. Resonant frequency of a particular fan element may drift, for example due to changes in temperature. Adjustments made at 1804 allow the drift in resonant frequency to be accounted for.

For example, fan element(s) in system 700 (e.g. cells 600) may be driven at its structural resonant frequency/frequencies, at 1802. This resonant frequency may also be at or near the acoustic resonant frequency for chamber 650. At 1804, feedback is used to maintain the fan element(s) of system 700 at resonance and, in some embodiments in which multiple fan elements are driven, one hundred and eighty degrees out of phase. Thus, the efficiency of fan element(s) in driving fluid flow through system 700 may be maintained. In some embodiments, 1804 includes sampling the current through the fan element(s) and adjusting the current to maintain resonance and low input power. As a result, high velocities through orifices 632 may be achieved and high volumes of fluid drawn through channels 690.

Thus, systems, such as system(s) 600, 700, 800, 900, 1000, 1100, 1200, 1300, 1400, 1500, 1600 and/or 1700, may be operated to drive fluid flow at the desired flow rates. Performance of a device employing method 1800 may thus be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
an orifice plate having at least one orifice therein, a first side, and a second side opposite to the first side;
a support structure;
a fan element proximate to the first side of the orifice plate, the fan element defining at least a portion of a chamber, the fan element including a plurality of edges, the fan element being anchored to the support structure such that an edge of the plurality of edges is free to undergo vibrational motion, the fan element being configured to undergo the vibrational motion to draw a fluid into the chamber through a vent and to drive the fluid from the first side of the orifice plate out of the chamber through the at least one orifice to the second side of the orifice plate, the fluid driven through the at least one orifice resulting in a low pressure region proximate to the second side orifice plate, the vent being different from the at least one orifice;

at least one channel adjacent to the chamber, the fluid being drawn through the at least one channel in response to the fluid being driven through the at least one orifice and the low pressure region being formed; and an exit vent different from the vent, the orifice plate being between the fan element and the exit vent, the fluid drawn through the at least one channel and the fluid being driven through the at least one orifice traveling through the exit vent, a first flow of the fluid driven through the at least one orifice and traveling through the exit vent being not greater than a second flow of the fluid drawn through the at least one channel and traveling through the exit vent.

2. The system of claim 1, wherein at least one of the plurality of edges is an anchored edge and is anchored to the support structure such that the edge is free to vibrate.

3. The system of claim 2, wherein a border of the at least one channel is defined by the fan element, wherein the orifice plate is proximate to the edge.

4. The system of claim 3, wherein the fluid flows substantially parallel to a surface of the fan element.

5. The system of claim 1, further comprising:
a jet channel, the fluid flowing through the at least one channel being in a direction substantially perpendicular to the jet channel.

6. The system of claim 5, wherein a jet channel edge of the jet channel is formed by a jet channel wall, the jet channel wall having an aperture therein, the at least one channel and the jet channel being configured such that the fluid is driven through the aperture.

7. The system of claim 1, further comprising:
an additional fan element including an additional plurality of anchored sides such that an additional central portion of the additional fan element undergoes an additional vibrational motion.

8. The system of claim 7, wherein the additional vibrational motion of the additional fan element is out-of-phase with the vibrational motion of the fan element.

9. A system, comprising:
a plurality of cooling cells, each of the plurality of cooling cells including an orifice plate, a support structure, a fan element, an exit vent, and a chamber, at least a portion of the chamber being defined by the fan element, the orifice plate being between the fan element and the exit vent, at least one channel being adjacent to the chamber of at least one of the plurality of cooling cells, the orifice plate having at least one orifice therein, a first side, and a second side opposite to the first side, the fan element being proximate to the first side of the orifice plate, the fan element including a plurality of edges, the fan element being anchored to the support structure such that an edge of the plurality of edges is free to undergo vibrational motion, the fan element being configured to undergo the vibrational motion to draw a fluid into the chamber through a vent and to drive the fluid from the first side of the orifice plate out of the chamber through the at least one orifice to the second side of the orifice plate, the vent being different from the at least one orifice, the fluid driven through the at least one orifice resulting in a low pressure region proximate to the second side orifice plate, the fluid being drawn through the at least one channel in response to the fluid being driven through the at least one orifice and the low pressure region formed, the fluid drawn through the at least one channel and the fluid being driven through the at least one orifice traveling through the exit vent, a first flow of the fluid driven through the at least one orifice and traveling through the exit vent being not greater than a second flow of the fluid drawn through the at least one channel and traveling through the exit vent.

10. The system of claim 9, wherein
at least one of the plurality of edges is an anchored edge and is anchored to the support structure such that the edge is free to vibrate.

11. The system of claim 10, wherein a border of the at least one channel is defined by the fan element, wherein the orifice plate is proximate to the edge.

12. The system of claim 11, wherein the fluid flows substantially parallel to a surface of the fan element.

13. The system of claim 9, further comprising:
a jet channel, the fluid flowing through the at least one channel being in a direction substantially perpendicular to the jet channel.

14. The system of claim 9, wherein the plurality of cooling cells shares the orifice plate.

15. A method, comprising:
driving a fan element to undergo vibrational motion, the fan element defining at least a portion of a chamber, the fan element including a plurality of edges and being anchored to a support structure such that an edge of the plurality of edges is free to undergo the vibrational motion, the vibrational motion of the fan element drawing a fluid into the chamber through a vent and driving the fluid from a first side of an orifice plate out of the chamber through at least one orifice of the orifice plate to a second side of the orifice plate, the second side being opposite to the first side, the fan element being proximate to the first side of the orifice plate, the orifice plate being between the fan element and an exit vent, the vent being different from the at least one orifice, the fluid driven through the at least one orifice resulting in a low pressure region proximate to the second side orifice plate, the fluid being drawn through at least one channel adjacent to the chamber in response to the fluid being driven through the at least one orifice, the fluid drawn through the at least one channel and the fluid being driven through the at least one orifice traveling through the exit vent, a first flow of the fluid driven through the at least one orifice and traveling through the exit vent being not greater than a second flow of the fluid drawn through the at least one channel and traveling through the exit vent; and
utilizing feedback to control a frequency of the vibrational motion and the low pressure region formed.

16. The method of claim 15, wherein at least one of the plurality of edges is an anchored edge and is anchored to the support structure such that the edge is free to vibrate.

* * * * *